US008886551B2

(12) United States Patent
Offenberg

(10) Patent No.: US 8,886,551 B2
(45) Date of Patent: Nov. 11, 2014

(54) CENTRALIZED JOB SCHEDULING MATURITY MODEL

(75) Inventor: Joseph Offenberg, Staten Island, NY (US)

(73) Assignee: CA, Inc., New York, NY (US)

(*) Notice: Subject to any disclaimer, the term of this patent is extended or adjusted under 35 U.S.C. 154(b) by 1880 days.

(21) Appl. No.: 11/224,053

(22) Filed: Sep. 13, 2005

(65) Prior Publication Data

US 2007/0061180 A1 Mar. 15, 2007

(51) Int. Cl.
*G06Q 10/00* (2012.01)
*G06Q 10/06* (2012.01)

(52) U.S. Cl.
CPC .......... *G06Q 10/06* (2013.01); *G06Q 10/06312* (2013.01)
USPC ....... 705/7.22; 705/7.12; 705/7.13; 705/7.21; 705/7.23; 705/7.24; 705/7.25; 705/7.26; 705/348; 709/223

(58) Field of Classification Search
USPC ....................................................... 705/7.22
See application file for complete search history.

(56) References Cited

U.S. PATENT DOCUMENTS

| | | | |
|---|---|---|---|
| 5,233,513 A | 8/1993 | Doyle | 354/401 |
| 5,960,420 A | 9/1999 | Leymann et al. | 707/1 |
| 5,974,392 A | 10/1999 | Endo | 705/8 |
| 6,256,773 B1 | 7/2001 | Bowman-Amuah | 717/1 |
| 6,278,977 B1 | 8/2001 | Agrawal et al. | 705/7 |
| 6,308,162 B1 | 10/2001 | Ouimet et al. | 705/7 |
| 6,424,979 B1 | 7/2002 | Livingston et al. | 707/511 |
| 6,519,571 B1 | 2/2003 | Guheen et al. | 705/14 |
| 6,519,642 B1 | 2/2003 | Olsen et al. | 709/227 |
| 6,615,166 B1 * | 9/2003 | Guheen et al. | 703/27 |
| 6,662,355 B1 | 12/2003 | Caswell et al. | 717/103 |
| 6,876,993 B2 | 4/2005 | LaButte et al. | 706/47 |
| 6,895,382 B1 | 5/2005 | Srinivasan et al. | 705/7 |
| 6,895,403 B2 | 5/2005 | Cardwell et al. | 707/10 |
| 6,959,268 B1 | 10/2005 | Myers, Jr. et al. | 703/6 |
| 6,990,482 B1 | 1/2006 | Piotrowski et al. | 707/3 |
| 7,035,809 B2 | 4/2006 | Miller et al. | 705/8 |
| 7,069,179 B2 | 6/2006 | Kim et al. | 702/182 |
| 7,069,234 B1 | 6/2006 | Cornelius et al. | 705/26 |
| 7,197,520 B1 | 3/2007 | Matthews et al. | 707/204 |
| 7,290,275 B2 | 10/2007 | Baudoin et al. | 726/1 |

(Continued)

OTHER PUBLICATIONS

Anonymous, Virtual Machine, Jun. 2004, Wikipedia, http://web.archive.org/web/20040712083524/http://en.wikipedia.org/wiki/Virtual_machine.*

(Continued)

*Primary Examiner* — Beth V Boswell
*Assistant Examiner* — Mehmet Yesildag
(74) *Attorney, Agent, or Firm* — Pillsbury Winthrop Shaw Pittman LLP

(57) ABSTRACT

The invention provides systems and methods for improving the job scheduling structure of an organization by raising the job scheduling maturity level of the organization. In one embodiment, a plurality of job management maturity levels may be defined and arranged in a hierarchy. Current job management information may then be received from the organization regarding the organization's current job management structure. Using this current job management information, a current job management maturity level may be determined from the plurality of maturity levels. A target maturity level may then be selected from the plurality of job management maturity levels. One or more maturation operations may be devised that, when implemented, shift the organization to the target maturity level. The one or more maturation operations may then be performed, thus, shifting the organization to the target maturity level.

25 Claims, 19 Drawing Sheets

(56) References Cited

U.S. PATENT DOCUMENTS

| | | | |
|---|---|---|---|
| 7,315,826 B1 | 1/2008 | Guheen et al. | 705/7 |
| 7,350,138 B1 | 3/2008 | Swaminathan et al. | 715/500 |
| 7,421,617 B2 | 9/2008 | Anderson et al. | 714/15 |
| 7,447,729 B1 | 11/2008 | Thakur et al. | 709/200 |
| 7,668,947 B2 | 2/2010 | Hutchinson et al. | 709/223 |
| 7,685,207 B1 | 3/2010 | Helms | 707/790 |
| 7,703,070 B2 | 4/2010 | Bisceglia | 717/101 |
| 7,734,594 B2 | 6/2010 | Wang | 707/644 |
| 7,747,577 B2 | 6/2010 | Cannon et al. | 707/650 |
| 7,752,070 B2 | 7/2010 | Hatcher et al. | 705/11 |
| 7,752,437 B1 | 7/2010 | Thakur et al. | 713/165 |
| 8,073,880 B2 | 12/2011 | LaMonica | 707/812 |
| 8,126,768 B2 | 2/2012 | Mehrotra et al. | 705/7.36 |
| 2001/0052108 A1 | 12/2001 | Bowman-Amuah | 717/1 |
| 2002/0029319 A1 | 3/2002 | Robbins et al. | 711/114 |
| 2002/0065696 A1 | 5/2002 | Hack et al. | 705/7 |
| 2002/0065698 A1 | 5/2002 | Schick et al. | 705/8 |
| 2002/0116362 A1 | 8/2002 | Li | |
| 2002/0144256 A1 | 10/2002 | Budhiraja et al. | 717/174 |
| 2002/0174045 A1 | 11/2002 | Arena et al. | 705/36 |
| 2002/0188927 A1 | 12/2002 | Bellagamba | 717/101 |
| 2003/0093521 A1 | 5/2003 | Schlonski et al. | 709/224 |
| 2003/0110067 A1* | 6/2003 | Miller et al. | 705/8 |
| 2003/0171976 A1 | 9/2003 | Farnes et al. | 705/10 |
| 2003/0172020 A1 | 9/2003 | Davies et al. | 705/36 |
| 2003/0216926 A1 | 11/2003 | Scotto et al. | 705/1 |
| 2004/0010709 A1 | 1/2004 | Baudoin et al. | 713/201 |
| 2004/0015377 A1 | 1/2004 | Hostetler | 705/7 |
| 2004/0039619 A1 | 2/2004 | Zarb | 705/7 |
| 2004/0054545 A1 | 3/2004 | Knight | 705/1 |
| 2004/0078654 A1 | 4/2004 | Holland et al. | 714/13 |
| 2004/0093244 A1 | 5/2004 | Hatcher et al. | 705/7 |
| 2004/0107125 A1 | 6/2004 | Guheen et al. | 705/7 |
| 2004/0117241 A1 | 6/2004 | Krasikov | |
| 2004/0193476 A1 | 9/2004 | Aerdts | 705/10 |
| 2004/0225549 A1 | 11/2004 | Parker et al. | 705/8 |
| 2005/0043976 A1 | 2/2005 | Leehman | 705/7 |
| 2005/0108043 A1 | 5/2005 | Davidson | 705/1 |
| 2005/0114829 A1 | 5/2005 | Robin et al. | 717/101 |
| 2005/0120032 A1 | 6/2005 | Liebich et al. | 707/100 |
| 2005/0125272 A1 | 6/2005 | Hostetler | 705/7 |
| 2005/0159973 A1 | 7/2005 | Krause et al. | 705/1 |
| 2005/0165809 A1 | 7/2005 | Leymann | |
| 2005/0228713 A1 | 10/2005 | Manzolillo | |
| 2005/0234767 A1 | 10/2005 | Bolzman | |
| 2005/0267771 A1 | 12/2005 | Biondi et al. | 705/1 |
| 2006/0045039 A1 | 3/2006 | Tsuneya et al. | 370/318 |
| 2006/0059253 A1* | 3/2006 | Goodman et al. | 709/223 |
| 2006/0064481 A1 | 3/2006 | Baron et al. | 709/224 |
| 2006/0069540 A1* | 3/2006 | Krutz | 703/22 |
| 2006/0080656 A1 | 4/2006 | Cain et al. | 717/174 |
| 2006/0085242 A1 | 4/2006 | Mark | |
| 2006/0117012 A1 | 6/2006 | Rizzolo et al. | 707/9 |
| 2006/0161883 A1* | 7/2006 | Lubrecht et al. | 717/104 |
| 2007/0021967 A1 | 1/2007 | Jaligama et al. | 705/1 |
| 2007/0027701 A1 | 2/2007 | Cohn | |
| 2007/0027734 A1 | 2/2007 | Hughes | 705/7 |
| 2007/0043538 A1 | 2/2007 | Johnson et al. | 702/188 |
| 2007/0061191 A1* | 3/2007 | Mehrotra et al. | 705/11 |
| 2007/0100892 A1 | 5/2007 | Kephart et al. | 707/200 |
| 2007/0101167 A1 | 5/2007 | Lindley et al. | 713/300 |
| 2008/0086357 A1 | 4/2008 | Choubey et al. | 705/10 |
| 2008/0114700 A1 | 5/2008 | Moore et al. | 705/36 R |
| 2008/0114792 A1 | 5/2008 | LaMonica | 707/100 |
| 2010/0114833 A1 | 5/2010 | Mu | 707/650 |

OTHER PUBLICATIONS

Subramani, Vijay, Rajkumar Kettimuthu, Srividya Srinivasan, and S. Sadayappan. "Distributed job scheduling on computational grids using multiple simultaneous requests." In High Performance Distributed Computing, 2002. HPDC-11 2002. Proceedings. 11th IEEE International Symposium on, pp. 359-366. IEEE, 2002.*

Stephen Hartman, Questions on organizational behaviour, 2001, https://web.archive.org/web/20010306201637/http://iris.nyit.edu/~shartman/mba0299/120_0299.htm.*

Anonymous, CS/10,000 and the capability maturity model, 2001, https://web.archive.org/web/20010509070436/http://www.cscl.com/techsupp/techdocs/cmmwp.html.*

Platinum technology delivers first integrated process/project management software; Platinum process continuum tames the business of software delivery; enables companies to improve quality. (Aug. 12, 1996). Business Wire.*

Pragma Systems launches processMax(R) release 5.0. (Nov. 12, 2003). PR Newswire.*

Tata interactive becomes sixth company in world to achieve top carnegie mellon staff development rating; people CMM level 5 assessment recognizes world-class employee training and management processes; accolade follows previous CMM level 5 ranking in software processes. (Jul. 8, 2003). PR Newswire.*

Dickey, M. (2003). Software process, re-use, and applications are key to transforming the military and aerospace sectors. Military & Aerospace Electronics, 14(9), 42(2).*

Clarke, Angela, et al., "The Development of a Best Practice Model for Change Management", *European Management Journal*, vol. 15, No. 5, 1997, pp. 537-545.

Knodel, Ted, "Preparing the Organizational 'Soil' for *Measurable and Sustainable* Change: Business Value Management and Project Governance", *Journal of Change Management*, vol. 4, No. 1, Mar. 2004 (received Jun. 2003), pp. 45-62.

Schmid, Ph.D., Hillel, "Relationships Between Organizational Properties and Organizational Effectiveness in Three Types of Nonprofit Human Service Organizations", *Public Personnel Management*, vol. 31, No. 3, Fall 2002, ABI/INFORM Global, pp. 377-395.

"Prosci's Change Management Maturity Model™", Prosci, © 2004, pp. 1-8.

Nicholls, MG, et al., "Using OR for Diagnosis and Facilitation in Change Programmes: a University Application", *Journal of the Operational Research Society*, vol. 55, 2004, pp. 440-452.

"Delivering Intelligence for Business Value and Insight", Copyright 2002 Computer Associates International, Inc., MP160920902, 4 pages.

Mehrotra, Vibhav, "Growing into Release Management via an Iterative Approach", Emphasis on Enterprise, *Programmer's Paradise Magazine*, Apr. 2005, pp. 24-25.

Kakita, Howard H., et al., "Improving Process Maturity to Compete in the Desktop Printer Market", *PDMA Visions Magazine*, Apr. 1998, pp. 1-8.

Clarke, Nick, "Asset Management and Monitoring", Tessella Support Services PLC, Issue V1.R0.M1, Oct. 2005, 21 pages.

Anonymous, "Enterprise Asset Management Systems", *Work Study*, vol. 51, No. 6/7, ABI/INFORM Global, 2002, pp. 320-328 (2 pages).

Paulk, Mark C., et al., "Capability Maturity Model, Version 1.1", *IEEE Software*, vol. 10, No. 4, Jul. 1993, pp. 18-27.

Diaz, Michael, et al., "How Software Process Improvement Helped Motorola", *IEEE Software*, vol. 14, No. 5, Sep./Oct. 1997, pp. 75-81.

Bosch, Jan, "Maturity and Evolution in Software Product Lines: Approaches, Artefacts and Organization",*Software Product Lines Lecture Notes in Computer Science*, 2002, vol. 2379/2002, pp. 257-271.

Paulk, Mark C., "Key Practices of the Capability Maturity Model", Software Engineering Institute, Camegia Mellon University, Technical Report CMU/SEI-93-TR-025, Feb. 1993, 479 pages.

Herbsleb, James, et al., "Software Quality and the Capability Maturity Model", *Communications of the ACM*, vol. 40, No. 6, Jun. 1997, pp. 30-40.

Mahakul, T. K., et al., "Implementation of Enterprise Asset Management Using IT Tools: A Case Study of IB Thermal Power Station", IB Power Station, Orissa, India; *Journal of Information Technology Management*, vol. XVI, No. 4, 2005, pp. 39-67 (29 pages).

Office Action issued for U.S. Appl. No. 11/194,231, dated Jun. 6, 2013.

(56) References Cited

OTHER PUBLICATIONS

Office Action issued for U.S. Appl. No. 11/194,231, dated Jan. 2, 2014.
Office Action issued for U.S. Appl. No. 11/558,795, dated Jul. 22, 2014.

Jooste, JL, et al., "A Performance Management Model for Physical Asset Management," SA Journal of Industrial Engineering, vol. 15, No. 2, 2004, pp. 45-66.
Office Action issued for U.S. Appl. No. 11/194,231, dated Sep. 18, 2014.

* cited by examiner

Tertiary Maturity Level
Responsive

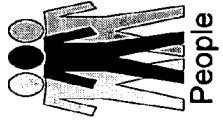
People
- Interact with Event Mgmt Mgr
- Interact with App Developers
- Interact with Web Administrators
- Interact with Asset Mgmt Mgr

Process
- System Event Scheduling
- Application Event Scheduling
- Dynamic work placement based on system characteristics
- Centralized scheduling view
- Job and Job Scheduling System failures trigger opening of incidents
- Know error recovery coded into Job Scheduling System when possible for Problem Mgmt
- Automated recovery process
- Cost of labor & maintenance for Job Scheduling Service understood
- SLAs defined with customers of Job Scheduling Service

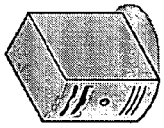
Technology
- Event based scheduling available
- Application based scheduling possible
- Dynamic work placement available
- Known error recovery automated
- Preparation for OLA, SLA and SLM monitoring

FIG. 2A

CENTRALIZED JOB SCHEDULING MATURITY MODEL

FIELD OF THE INVENTION

The invention relates to a system and method for improving the processes and structure for job scheduling within an organization.

BACKGROUND OF THE INVENTION

Job scheduling technology is a means to efficiently process data within business applications on a linear schedule. A problem for most organizations in the realm of job scheduling relates to the fact that many organizations have individual schedulers for each software application. These individual schedulers often make it difficult to correlate data processing across the multiple software applications. In some circumstances, software products may be provided that solve this problem, by providing a central scheduling service that can be utilized by all applications running on almost any software/hardware platform.

However, the processes and best practices that support delivery of this central scheduling service technology are not standardized. This may create problems, including the fact that processes supporting job scheduling may vary significantly from organization to organization (making uniform implementation of centralized job scheduling difficult). Sometimes organizations' current job scheduling processes may be inefficient, not aligned with an organization's business, or otherwise undesirable, so that implementation of central job scheduling software/hardware may be of little aid to their overall job scheduling structure. Another problem may include the fact that different organizations may have diverse job scheduling processes, therefore, a single provider of central job scheduling infrastructure may be required to adjust their functional requirements for each organization or for different units within an organization. Other problems may exist.

SUMMARY OF THE INVENTION

The invention solving these and other problems relates to a system and method for improving the processes and structure for job scheduling optimization within an organization. As used herein, job scheduling refers to the arrangement and regulation of the linear processing of discrete data sets or for performing other data-related tasks. As used herein, an organization may include a business organization, a government organization, a not-for-profit organization, a division or sub-group within a larger organization (e.g., a business unit or other sub-group) or other organization that regularly performs data processing "jobs" on its internal information systems.

In one embodiment, the invention provides a plurality of job scheduling maturity levels, each of which define the people, processes, technology, and/or other elements of an organization that are necessary for job scheduling at a given maturity level. In one embodiment, an organization may be assessed and its job scheduling structure may be improved by moving the organization from a first job scheduling maturity level to a second, more advanced, job scheduling maturity level. In some embodiments, different aspects or facets of an organization (referred to herein as "organizational aspects") are analyzed and addressed when transitioning the organization to a higher job scheduling maturity level.

In one embodiment, the invention provides a process wherein the job scheduling structure of an organization may be improved. As mentioned above, a plurality of job scheduling maturity levels may initially be defined. For each of the predefined maturity levels in the plurality of maturity levels, a standard set of people, processes, technology, or other elements may be identified. These standard sets may be represented by way of one or more lists, charts, blueprints, process, diagrams, or by other methods.

In some embodiments, the plurality of job scheduling maturity levels may be arranged in a hierarchy. For example, if a set of four job scheduling maturity levels were defined, the four maturity levels may be arranged as a primary maturity level, a secondary maturity level, a tertiary maturity level, and a quaternary maturity level, wherein the business focus or the business-oriented organizational maturity of the elements defined by the maturity levels increase from primary to quaternary maturity levels. In some embodiments, the return on investment that the organization receives from its job scheduling systems also increases from the primary to the quaternary maturity level. In one embodiment, these maturity levels may be given labels such as, for example, Active (primary maturity level), Efficient (secondary maturity level), Responsive (tertiary maturity level), and Business-Driven (quaternary maturity level). Other maturity levels may exist and other labels may be used.

In some embodiments, one or more organizational aspects of an organization may be addressed in each of the predefined maturity levels. In one embodiment, the one or more organizational aspects of an organization may include service level management, financial management, capacity management, business continuity, availability management, incident management, change and configuration management, personnel management, business integration, or other facets, aspects, or divisions.

In one embodiment, the process for improving the job scheduling structure of the organization may further include collecting and/or receiving information regarding the current job scheduling structure of the organization. This current job scheduling information may include information relating to the current people, processes, technology, or other elements that are used by an organization for job scheduling, job management, workflow management, and/or for other purposes. In some embodiments, current job scheduling information regarding the people, processes, technology or other elements of job scheduling in the organization may be related to one or more of the organizational aspects of the organization.

The current job scheduling information may be used to determine a current job scheduling maturity level for the organization from the plurality of predefined maturity levels. In determining the current maturity level, the standard set of elements of the predefined maturity levels may be compared to the received current job scheduling information across one or more of the organizational aspects of the organization. Individual organizations may each have unique attributes, such that a given organization may have varying levels of maturity across one or more of the organizational aspects (e.g., more mature in financial management, less mature in service level management, etc.). However, an overall comparison of an organization's current job scheduling information to the plurality of predefined maturity levels may be used to formulate an overall current job scheduling maturity level regardless of varying levels of maturity within and among the different organizational aspects of the organization.

A target job scheduling maturity level may then be determined. In some embodiments, the target maturity level is the maturity level immediately above the current maturity level in the hierarchy of predefined maturity levels. This may result from each maturity level in the hierarchy defining prerequisite elements for the maturity level immediately above it in the hierarchy. In other embodiments, the target maturity level may be several places higher in the hierarchy than the current maturity level.

In one embodiment, one or more maturation operations may then be devised. These maturation operations, when implemented, may shift the organization to the target maturity level. In one embodiment, a comparison of the current job scheduling information to the standard set of elements defined by the target maturity level may be used to devise the maturation operations. The maturation operations may include operations designed to augment the people, processes, technology, and/or other elements of the organization across one or more of the one or more organizational aspects. Because different organizations are likely to have unique characteristics across organizational aspects, the maturation operations necessary to bring Organization A from a primary to a secondary maturity level may not match the maturation operations necessary to do the same for Organization B.

One or more of the maturation operations may then be performed within or upon the organization across the one or more organizational aspects, thus shifting the organization from the current job scheduling maturity level to the target job scheduling maturity level. In some embodiments, one or more verification operations may also be performed to ensure the one or more of the organizational aspects are operating properly at the target maturity level. These verification operations may include the measurement of predefined performance metrics for one or more of the organizational aspects.

In some embodiments, one or more of the operations of the above-described process may be repeated, such that the organization's job scheduling structure may be raised to other maturity levels. Some organizations may not desire or be capable of achieving the highest possible job scheduling maturity level. As such, these organizations may only move one up one or two maturity levels in the predefined hierarchy. However, other organizations may desire to reach the optimal or highest possible job scheduling maturity level in the hierarchy. Thus, these organizations may undergo a stepwise process to be brought to the highest of the predefined maturity levels.

In one embodiment, the invention provides a computer-implemented system enabling performance of job scheduling maturity level evaluation and improvement or other features, functions, or methods described herein. In another embodiment, the invention provides a computer readable medium for performing job scheduling maturity level evaluation and improvement or other features, functions, or methods described herein.

These and other objects, features, and advantages of the invention will be apparent through the detailed description of the preferred embodiments and the drawings attached hereto. It is also to be understood that both the foregoing general description and the following detailed description are exemplary and not restrictive of the scope of the invention.

BRIEF DESCRIPTION OF THE DRAWINGS

FIG. 2A illustrates a chart of people processes and technology according to an embodiment of the invention.

DETAILED DESCRIPTION

The invention relates to a system and method for improving the processes and structure for job scheduling optimization within an organization. The invention provides a set of job scheduling maturity levels, each of which define the people, processes, technology, and/or other elements of an organization that are necessary for job scheduling at a given maturity level. In one embodiment, an organization may be assessed and its job scheduling may be improved by moving the organization from a first job scheduling maturity level to a second, more advanced, job scheduling maturity level.

Figure 1:
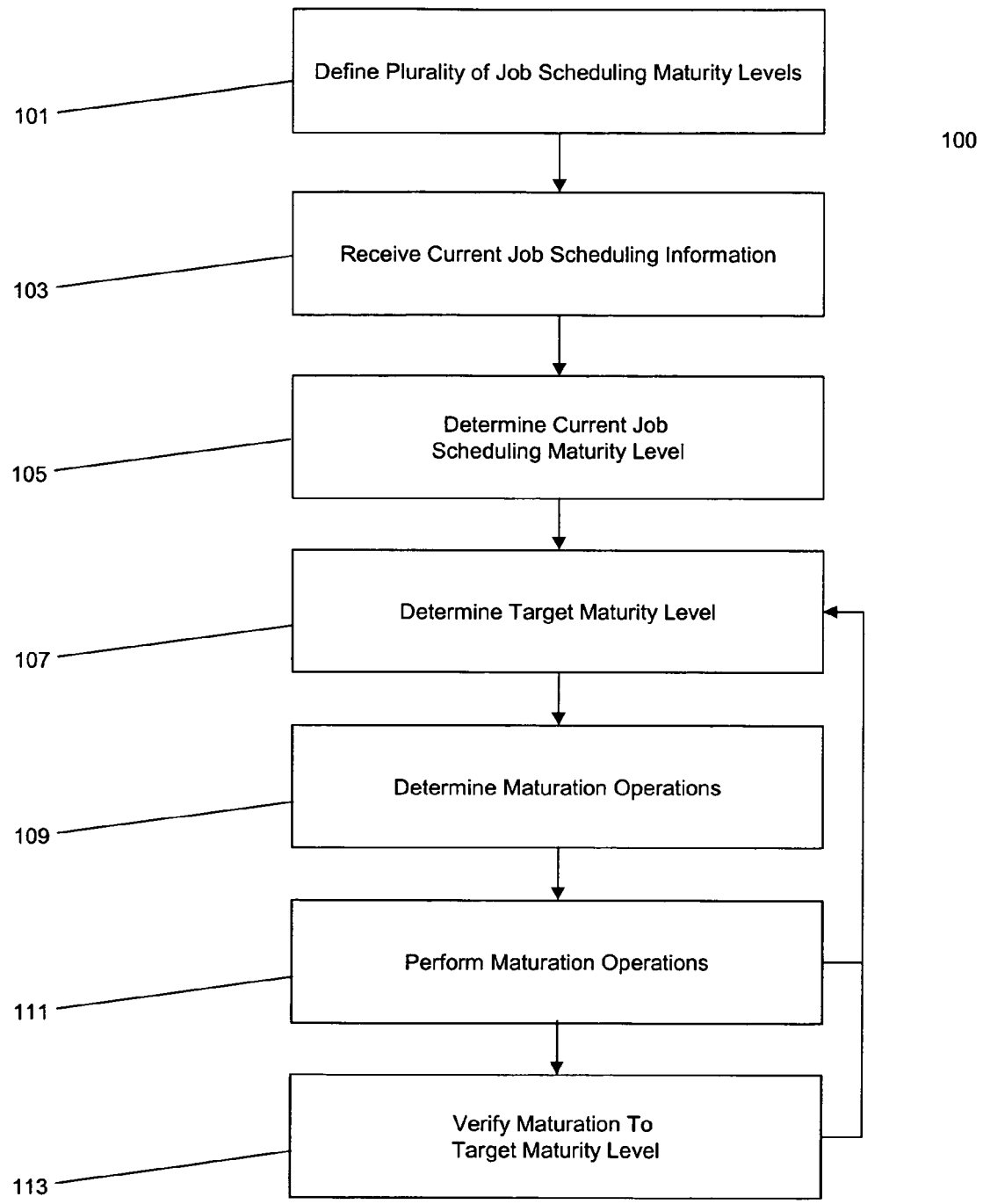
FIG. 1 illustrates a process for improving the job scheduling maturity level according to an embodiment of the invention.

FIG. 1 illustrates a process 100 according to one embodiment of the invention, wherein the job scheduling structure of an organization may be improved. In one embodiment, process 100 may include an operation 101, wherein a plurality of job scheduling maturity levels may be defined. A job scheduling maturity level may include one or more process definitions, which detail the people, processes, technology, and/or other elements necessary for an organization's job scheduling at a given maturity level.

Figure 2B:
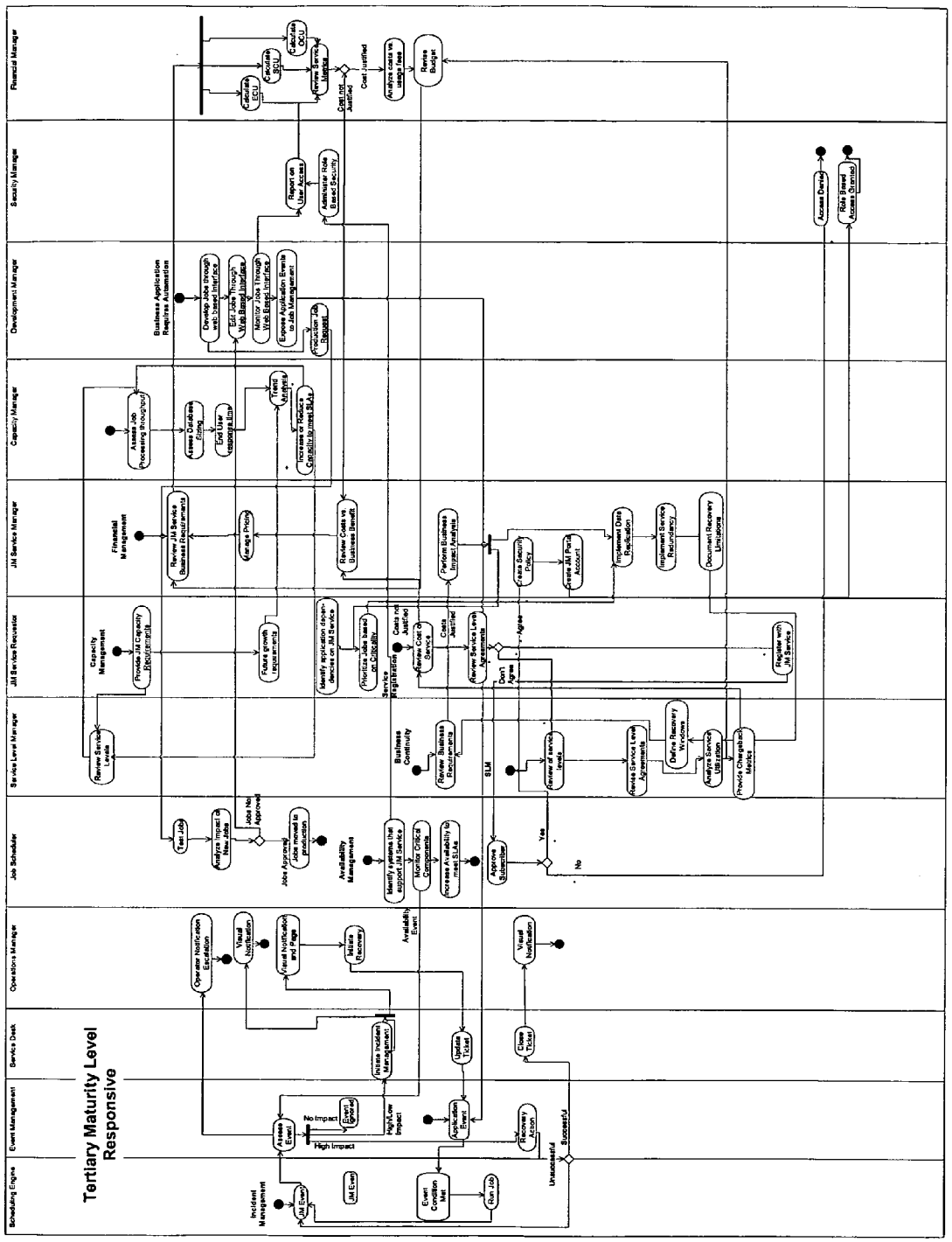
FIG. 2B illustrates a process blueprint according to an embodiment of the invention.

For each of the predefined maturity levels in the plurality of maturity levels, a standard set of people, processes, technology, or other elements may be identified. These standard sets may be represented by way of one or more lists, charts, blueprints, process, diagrams, or other methods. For example, FIG. 2A illustrates a chart of some of the people, processes, and technology involved in a Responsive maturity level. FIG. 2B illustrates a process blueprint of a Responsive maturity level.

In some embodiments, one or more organizational aspects of an organization may be addressed in each of the predefined maturity levels. In one embodiment, the one or more organizational aspects of an organization may include service level management (e.g., management of agreements of the level of service provided to job scheduling customers [internal or external]), financial management (e.g., accounting for the costs and return on investment of the job scheduling service), capacity management (e.g., ensuring the job scheduling service has the technical capacity to meet agreed service levels and planning for future growth), business continuity (e.g., ensuring that the job scheduling service can be provided following a business disruption such as, for example, a natural disaster), availability management (e.g., ensuring the job scheduling service is available as the level dictated by service level agreements), incident management (e.g., ensuring that events which may interrupt job scheduling services are resolved and tracked), change and configuration management (e.g., ensuring that changes to job scheduling services or job definitions themselves are handled in a controlled manner and tracked), personnel management (e.g., ensuring that personnel have the skills required to execute the processes supporting job scheduling services), business integration (e.g., ensuring that job scheduling services are accessible to systems and applications at the required level), or other facets, aspects, or divisions or the organization. The standard set of people, processes, technology and/or other elements defined by each maturity level may deal with or relate to one or more of these organizational aspects.

In some embodiments, the plurality of job scheduling maturity levels may be arranged in a hierarchy. For example, the plurality of job scheduling maturity levels may be arranged as a primary maturity level, a secondary maturity level, a tertiary maturity level, and a quaternary maturity level, wherein the business focus or business-oriented organizational maturity of the processes defined by the maturity levels increases from primary to quaternary maturity levels. In one embodiment, these maturity levels may be given alternate labels such as, for example, Active (primary maturity level), Efficient (secondary maturity level), Responsive (tertiary maturity level), Business-Driven (quaternary maturity level). Other maturity levels may exist and other labels may be used.

In an operation 103, information regarding the current job scheduling structure of the organization may be collected or received. This current job scheduling information may include information relating to the current people, processes, technology, or other elements that are used by an organization for job scheduling, job management, workflow management, and/or for other purposes. In some embodiments, current job scheduling information regarding the people, processes, technology or other elements of job scheduling in the organization may be related to one or more organizational aspects of the organization.

In an operation 105, the current job scheduling information may be used to determine a current job scheduling maturity level for the organization from the plurality of maturity levels. In determining the current maturity level, the standard set of elements of the predefined maturity levels may be compared to the received current job scheduling information across one or more of the organizational aspects of the organization. Individual organizations may each have unique attributes such that a given organization may have varying maturity levels across one or more of the organizational aspects (e.g., more mature in financial management, less mature in service level management, etc.). However, an overall comparison of an organization's current job scheduling information to the plurality of predefined maturity levels may be used to formulate an overall current job scheduling maturity level regardless of varying levels of maturity within and among the different organizational aspects of the organization.

In an operation 107, a target job scheduling maturity level may be determined. In some embodiments, the target maturity level is the maturity level immediately above the current maturity level in the hierarchy of predefined maturity levels. This may be because each maturity level in the hierarchy defines prerequisite elements for the maturity level immediately above it in the hierarchy. In other embodiments, the target maturity level may be several places higher in the hierarchy than the current maturity level.

In an operation 109, one or more maturation operations may be devised. These maturation operations, when implemented, may shift the organization to the target maturity level. In one embodiment, a comparison of the current job scheduling structure to the standard set of elements defined by the target maturity level may be used to devise the maturation operations. The maturation operations may include operations designed to augment the people, processes, technology, and/or other elements of the organization across one or more of the one or more organizational aspects. Because different organizations are likely to have unique characteristics across organizational aspects, the maturation operations necessary to bring Organization A from a primary to a secondary maturity level may not match the maturation operations necessary to do the same for Organization B.

In an operation 111, one or more of the one or more maturation operations may be performed within or upon the organization across the one or more organizational aspects, thus shifting the organization from the current job scheduling maturity level to the target job scheduling maturity level. In an operation 113, one or more verification operations may be performed to ensure the one or more of the organizational aspects are operating properly at the target maturity level. These verification operations may include the measurement of predefined performance metrics for one or more of the organizational aspects. In one embodiment, the predefined performance metrics may be defined in operation 109, contemporaneous to the definition of the one or more maturation operations.

Figure 3:
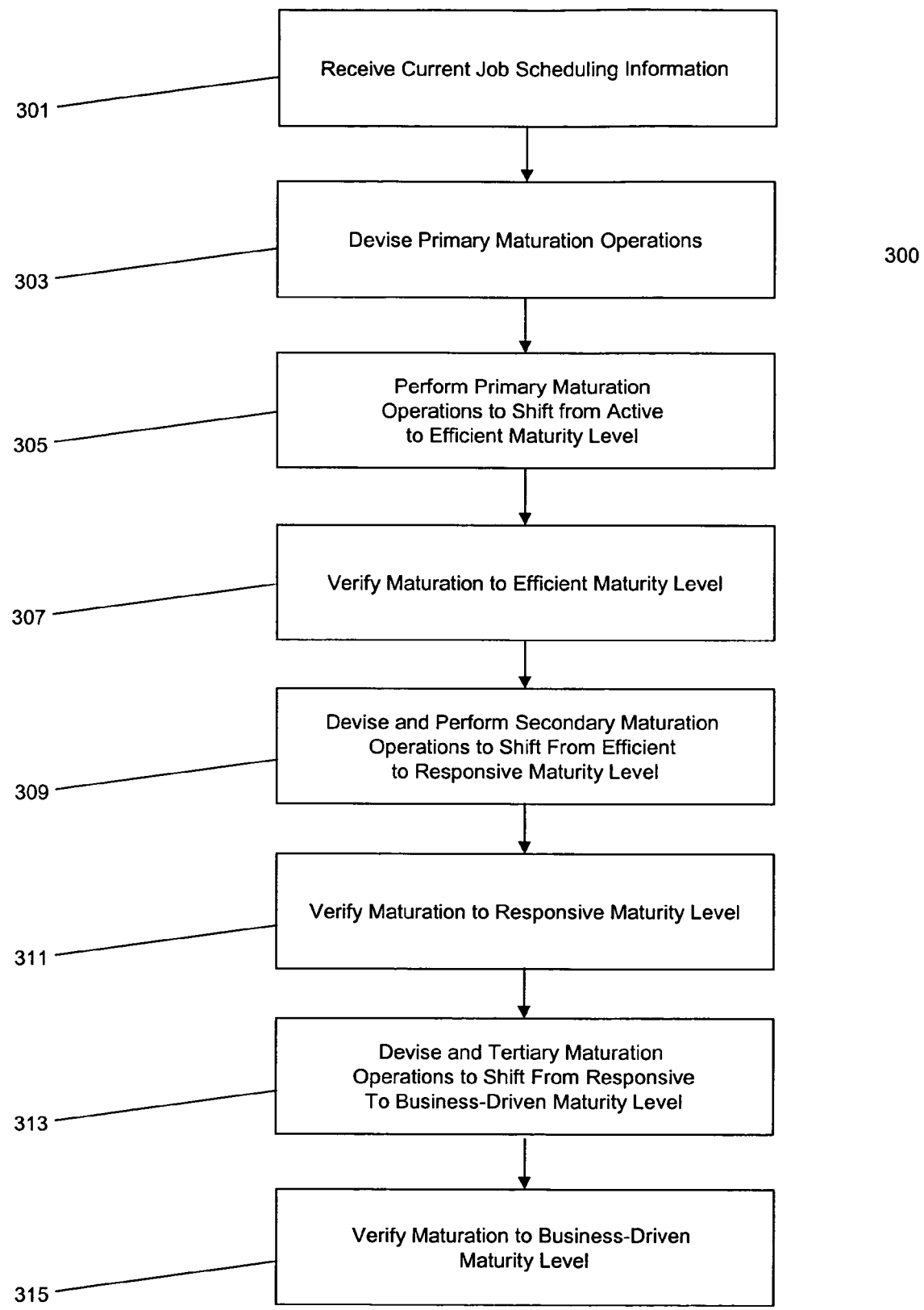
FIG. 3 illustrates a process for raising an organization's job scheduling processes from an Active to a Business-Driven maturity level.

As indicated in FIG. 1, one or more of the operations of process 100 may be repeated, such that the organization's job scheduling structure may be raised to additional levels. Some organizations may not desire or be capable of achieving the highest possible job scheduling maturity level. As such, they may only move one up one or two maturity levels in the predefined hierarchy. However, other organizations may be desire to reach the optimal or highest possible job scheduling maturity level, and thus may undergo a stepwise process to be brought to the highest of the defined maturity levels. FIG. 3 illustrates a stepwise process 300, wherein an organization may be taken from a primary or "active" job scheduling maturity level to a quaternary or "business-driven" job scheduling maturity level, thus, greatly improving the organization's job scheduling and workflow management according to established best practices and other standards.

In an operation 301, current job scheduling information regarding the current job scheduling structure of the organization may be gathered and/or received. This may include information regarding the people, processes, technology, or other elements of one or more organizational aspects of the organization. In an operation 303, the current job scheduling information, including the status of some or all of the organizational aspects of the organization (e.g., service level management, financial management, capacity management, etc.) may be discerned and used to devise one or more primary maturation operations that, when performed, bring the organization from a primary (e.g., Active) job scheduling maturity level to a secondary (e.g., Efficient) job scheduling maturity level.

Figure 4:
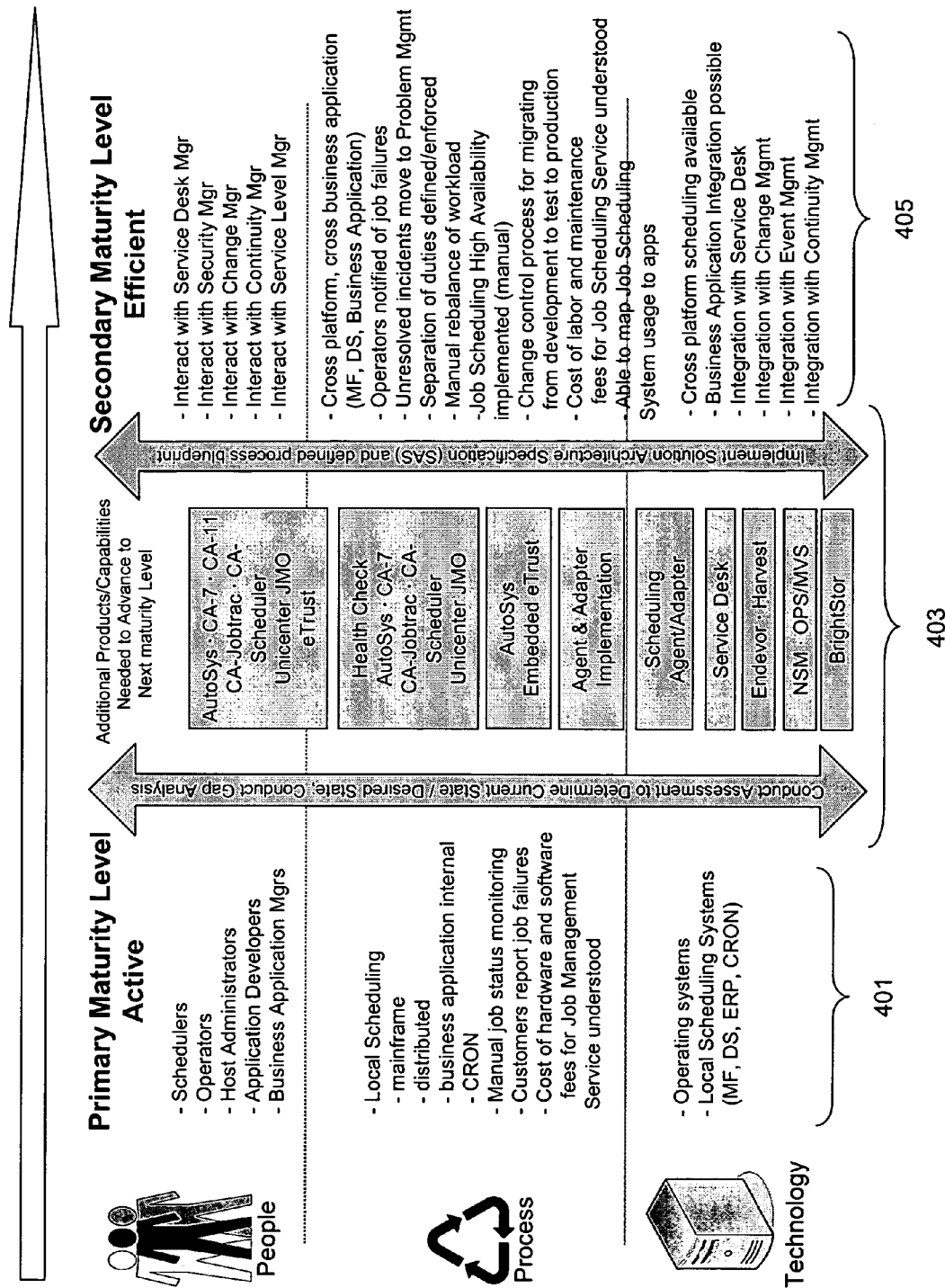
FIG. 4 illustrates a process for improving the job scheduling maturity level according to an embodiment of the invention.

FIG. 4 illustrates a transition from an Active maturity level to an efficient maturity level in terms of: a standard set 401 of people, processes, and technology typical of an organization operating at an active job scheduling maturity level; a set 403 of exemplary processes (including primary maturation processes), software, services, and/or products that are used to shift the organization to the efficient job scheduling maturity level; and a standard set 405 of people, processes, and technology necessary for an organization to operate at an efficient job scheduling maturity level. As would be appreciated by one having ordinary skill in the art, FIG. 4 is exemplary only. Other job scheduling maturity levels having other characteristics may exist. Additionally, while one or more of the products, services, software, or other items listed in the set 403 may refer to products or services available from Computer Associates, Inc., similar products/services available from other sources may be used. The one or more primary maturation operations may be devised using current job scheduling information (e.g., the information received in operation 301); the standard set 401 of people, processes, and technology for an active maturity level; the standard set 405 of people, processes, and technology for an efficient maturity level, and/or other information. In one embodiment, the one or more primary maturation operations may generally involve implementing a central job scheduling service within the organization.

The service level management aspect of job scheduling within an organization operating at an Active maturity level may be such that job scheduling is understood as a service provided by individual components of the organization's information technology (IT) infrastructure. In contrast, the service level management aspect of job scheduling within an organization operating at an Efficient maturity level may be such that job scheduling/management is understood to be a central service, available to all applications within the organization. Furthermore, the service level management aspect of job scheduling operating at an Efficient maturity level may include certain goals such as, for example, organizational recognition of job scheduling as an IT service, identification and analysis of service metrics for job scheduling that are related to business objectives of the organization, or other goals.

As mentioned above, this and/or other information may be utilized to devise and implement the one or more primary maturation operations that will cause at least the service level management aspects of the organization to shift to an Efficient maturity level. In one embodiment, the primary maturation operations relating to the service level management aspect of the organization may include: implementing a central job scheduling service, migrating jobs in decentralized schedulers towards the central job scheduling service, devising metrics for measuring the utilization of the central job scheduling service by various business units (e.g., jobs defined by business unit, jobs per/day by business unit), or other operations.

The financial management aspect of job scheduling within an organization operating at an Active maturity level may be such that the cost of job scheduling service includes only the cost of hardware and software. In contrast, the financial management aspect of job scheduling within an organization operating at an Efficient maturity level may be such that the cost of job scheduling service includes the costs of labor and maintenance in addition to the cost of hardware and software. Additionally, in an Efficient maturity level, usage of job scheduling services may be mapped to these costs, even though the return on investment for job scheduling services may not be completely understood. Furthermore, the financial management aspect of job scheduling operating at an Efficient maturity level may include certain goals such as, for example, accounting for the costs of delivering a central scheduling service to the organization, providing cost data to financial managers, or other goals.

This and/or other information may be utilized to devise and implement the one or more primary maturation operations that will cause at least the financial management aspects of the organization to shift to an Efficient maturity level. In one embodiment, the primary maturation operations relating to the financial management aspect of the organization may include: tracking the costs of central job management in terms of Equipment Cost Units (ECUs—the cost of hardware required to provide the central job scheduling service), Software Cost Units (SCUs—the software license and maintenance costs), Organization Cost Units (OCUs—the cost of people supporting the central job service) or other operations.

The capacity management aspect of job scheduling within an organization operating at an Active maturity level may be such that capacity grows as a reactive measure to customer complaints, and that new hardware is the normal solution to increase capacity. In contrast, the capacity management aspect of job scheduling within an organization operating at an Efficient maturity level may be such that workloads are balanced on systems manually by review of historical data or utilization of virtual machine technology. In some embodiments, virtual machine technology may refer to a pool of machines that provide a layer of abstraction between job definitions and the physical systems where jobs are run. In some embodiments, the pool of machines may increase or decrease in size as needed without a change to job definitions themselves. Furthermore, the capacity management aspect of job scheduling operating at an Efficient maturity level may include certain goals such as, for example, discerning the throughput limits of the implemented central scheduling service, recording throughput utilization of the central scheduling service for manual review, or other goals.

This and/or other information may be utilized to devise and implement the one or more primary maturation operations that will cause at least the capacity management aspect of the organization to shift to an Efficient maturity level. In one embodiment, the primary maturation operations relating to the capacity management aspect of the organization may include: recording job throughput in the central job scheduling service for manual review, implementing virtual machine technology to place work on the system in the organization with the best available resources, or other operations.

In many cases, the business continuity aspect of job scheduling within an organization operating at an Active maturity level may be non-existent. In contrast, the business continuity aspect of job scheduling within an organization operating at an Efficient maturity level may include manual business continuity based on database restore and software re-installations. The database restore and software re-installations may include utilization of a backup image of a database that is maintained for use in case of disaster. Software may then be re-installed on a new system and the data can be restored to a previous checkpoint. Furthermore, the business continuity aspect of job scheduling operating at an Efficient maturity level may include certain goals such as, for example, understanding the components of the central job scheduling system that require redundancy, utilizing native backup tools, or other goals.

This and/or other information may be utilized to devise and implement the one or more primary maturation operations that will cause at least the business continuity aspects of the organization to shift to an Efficient maturity level. In one embodiment, the primary maturation operations relating to the business continuity aspect of the organization may include: ensuring regular backup of job definitions, ensuring the documentation of the installation processes for the central job scheduling service, or other operations. A job definition contains the details required for the job scheduling service to execute a job such as, for example, what should be executed, where it should be executed, when it should be executed, or other details.

The availability management aspect of job scheduling within an organization operating at an Active maturity level may be simply reactive to system failures through troubleshooting and repair. In contrast, the availability management aspect of job scheduling within an organization operating at an Efficient maturity level may include systems monitoring of critical job scheduling resources (monitoring the health of job scheduling infrastructure such as, for example, servers, disks, memory, or other elements), job scheduling high availability manual failover to backup service (if the job scheduling service should become unavailable, a secondary service may be started manually). Furthermore, the availability management aspect of job scheduling operating at an Efficient maturity level may include certain goals such as, for example, ensuring that the central job scheduling service will failover in the event of a failure, ensuring the functionality of the job scheduling service is available to all applications that require it, or other goals.

This and/or other information may be utilized to devise and implement the one or more primary maturation operations that will cause at least the availability management aspects of the organization to shift to an Efficient maturity level. In one embodiment, the primary maturation operations relating to the availability management aspect of the organization may include: implementing high availability technology according to job management best practices (e.g., Computer Associates Autosys™ HA option), installing job scheduling agents on all platforms that require access to the central job scheduling service, or other operations.

In many situations, the incident management aspect of job scheduling within an organization operating at an Active maturity level may be non-existent. In contrast, the incident management aspect of job scheduling within an organization operating at an Efficient maturity level may include a central event manager and a common services console, wherein operators are immediately notified of job scheduling failures visually. Furthermore, the incident management aspect of job scheduling operating at an Efficient maturity level may include certain goals such as, for example, providing a mechanism to track incidents affecting job scheduling automation services, providing a mechanism to determine the root cause of incidents to prevent reoccurrence, feeding incidents to an enterprise problem management system, or other goals.

This and/or other information may be utilized to devise and implement the one or more primary maturation operations that will cause at least the incident management aspects of the organization to shift to an Efficient maturity level. In one embodiment, the primary maturation operations relating to the incident management aspect of the organization may include: implementing an event management system (such as Unicenter™ Network and Systems Manager [NSM], available from Computer Associates, Inc.) which is integrated with the central job scheduling services, implementing event notification policies to notify operators, implementing event policy and recovery jobs to automatically correct trouble, implementing portal document technology to ensure that recovery procedures are available electronically to all operators, integrating the central job scheduling service with notification to resolution IIF, or other operations.

In one embodiment, the change and configuration management aspect of job scheduling within an organization operating at an Active maturity level may include a manual change control process that is implemented by people (e.g., no change management database). In contrast, the change and configuration management aspect of job scheduling within an organization operating at an efficient maturity level may include gathering and making job scheduling configuration item information available in a repository, but not necessarily a change management database. Furthermore, the change and configuration management aspect of job scheduling operating at an Efficient maturity level may include certain goals such as, for example, accounting for all assets that makeup the centralized job scheduling services, providing accurate information on job scheduling configurations, maintaining a process for controlling job definitions and event policies (definitions as to how jobs react to external events) to minimize disruptions, or other goals.

This and/or other information may be utilized to devise and implement the one or more primary maturation operations that will cause at least the change and configuration aspects of the organization to shift to an Efficient maturity level. In one embodiment, the primary maturation operations relating to the change and configuration management aspect of the organization may include: implementing a basic change control process for migrating jobs to production, or other operations.

Figure 5A:
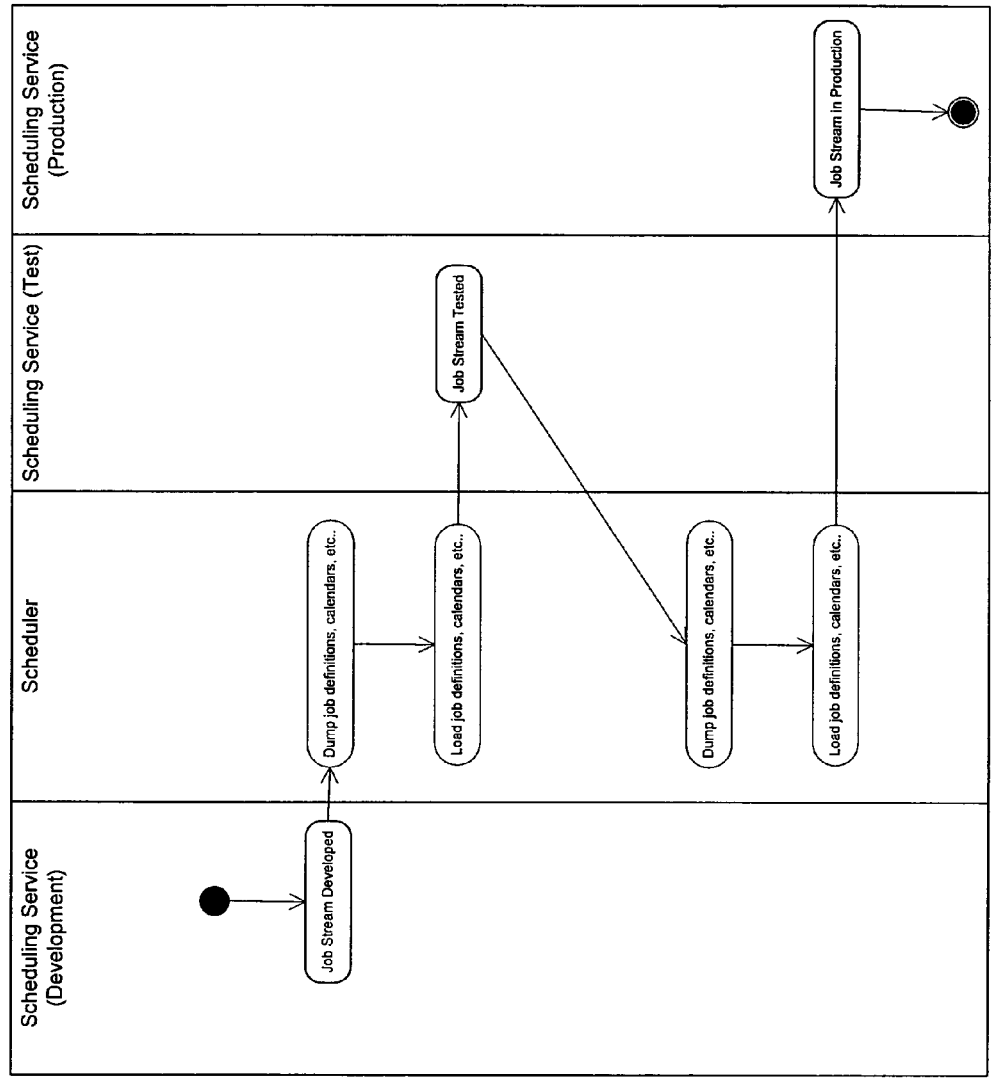
FIG. 5A illustrates a process blueprint according to an embodiment of the invention.

FIG. 5A illustrates an example of a basic change control process according to an embodiment of the invention that may be used at an Efficient maturity level. With reference to FIG. 5A, a basic change control process relating to job scheduling at an efficient maturity level may include creating job streams in a development service (for example, in CA-7™ engine, AutoSys Job Manager™, both offered by Computer Associates, Inc., and/or other applications). Completed job streams may then be migrated using job dump and load techniques to a test environment by the job schedulers (the test environment may be identical to production plus the added job streams). After an acceptable amount of successful job runs, the test environment may be rolled into production using the same migration techniques. Once jobs are in production, operators may monitor the status of jobs for failures. If failures occur, operators may follow restart and notification procedures.

The personnel management aspect of job scheduling within an organization operating at an Active maturity level may be such that users manage their own native scheduling service and learn the necessary technology. In contrast, the personnel management aspect of job scheduling within an organization operating at an efficient maturity level may include defined roles. However, required skills may not be defined. Furthermore, the personnel management aspect of job scheduling operating at an Efficient maturity level may include certain goals such as, for example, defining the roles of the people involved in delivering and maintaining the central job scheduling services or other goals.

This and/or other information may be utilized to devise and implement the one or more primary maturation operations that will cause at least the personnel management aspect of the organization to shift to an Efficient maturity level. In one embodiment, the primary maturation operations relating to the personnel management aspect of the organization may include: defining roles to support all central job scheduling management processes. In some embodiments, the secondary job scheduling maturity level may include certain roles such as, for example, IT operations manager, development manager, IT operations manager system administrators, job scheduler, scheduling service manager, or other roles.

Figure 5B:
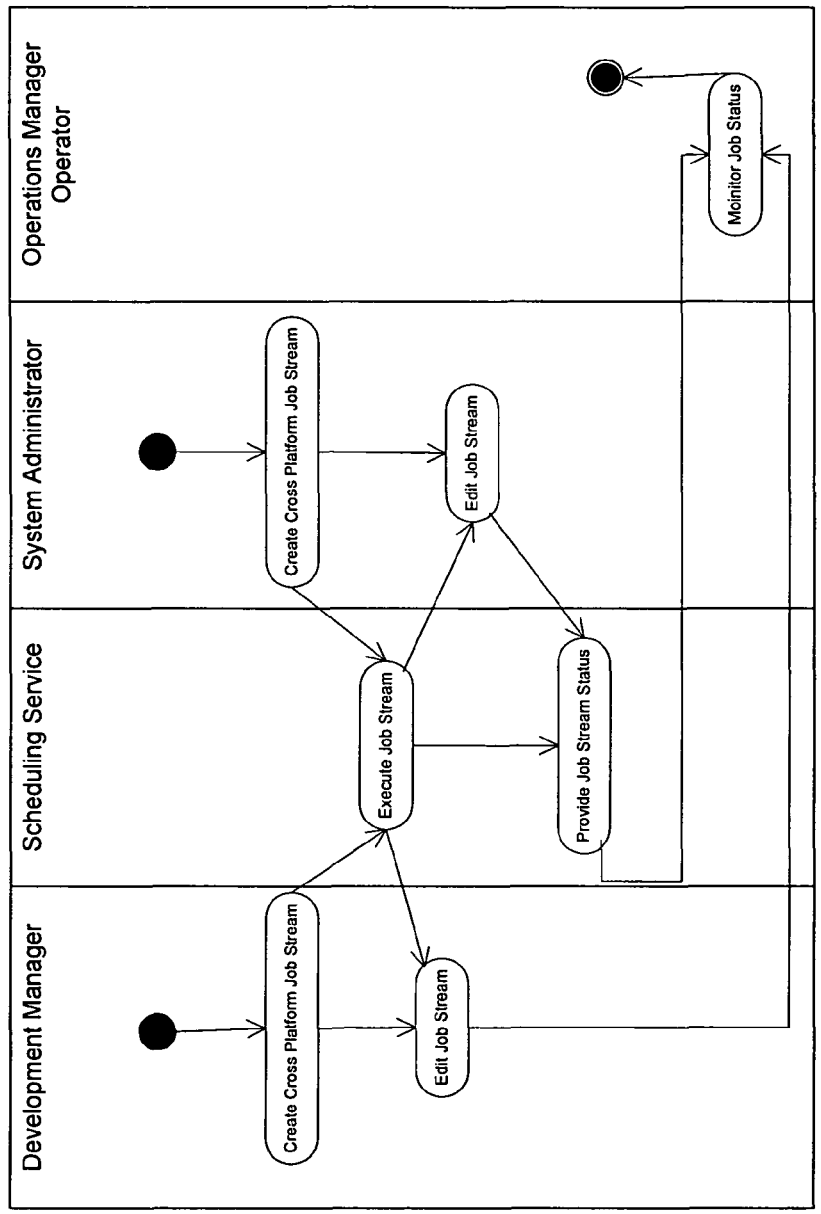
FIG. 5B illustrates a process blueprint according to an embodiment of the invention.

FIG. 5B illustrates an example of a basic job creation process according to an embodiment of the invention that may be used at an Efficient maturity level. Referring to FIG. 5B, job streams may be created in a development service (for example, CA-7™ engine, AutoSys Job Manager™, both available from Computer Associates, Inc., and/or other applications). Once jobs are in production, operators may monitor the status of jobs for failures, if failures occur, operators may follow restart and notification procedures outlines in job descriptions.

In some instances, the business integration aspect of job scheduling within an organization operating at an Active maturity level may be non-existent. In contrast, the business integration aspect of job scheduling within an organization operating at an Efficient maturity level may include a scheduler of schedulers (e.g., a hierarchy of schedulers) and a setup wherein business applications are controlled by the central job scheduling service. Furthermore, the business integration aspect of job scheduling operating at an Efficient maturity level may include certain goals such as, for example, ensuring that all applications have access to the central scheduling service or other goals.

This and/or other information may be utilized to devise and implement the one or more primary maturation operations that cause at least the business integration aspect of the organization to shift to an Efficient maturity level. In one embodiment, the primary maturation operations relating to the business integration aspect of the organization may include: providing documentation to install job agents on all systems that require access to the central job scheduling service.

Referring back to FIG. 3, in an operation 305, one or more of the primary maturation operations may be performed to shift the organization to an Efficient job scheduling maturity level across one or more of the organizational aspects. In an operation 307, the organization's shift to the Efficient maturity level may be verified. This verification may include monitoring the job scheduling performance across one or more of the organizational aspects, measurement of predefined critical success factors, and/or other methods.

Figure 6:
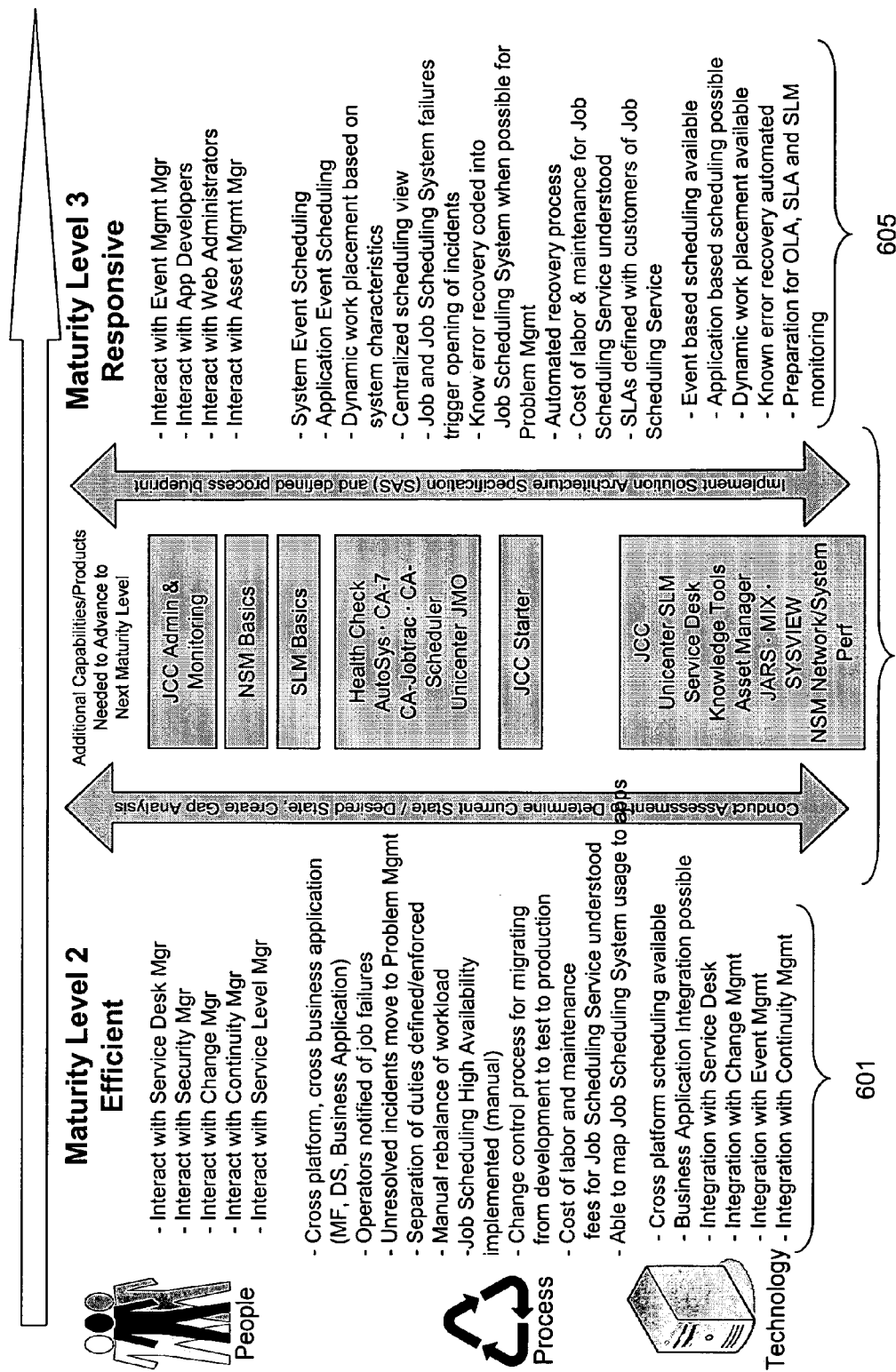
FIG. 6 illustrates a process for improving the job scheduling maturity level according to an embodiment of the invention.

In an operation 309, one or more secondary maturation operations may be devised and performed across one or more of the organizational aspects to shift the organization from the Efficient job scheduling maturity level achieved in operation 305 to a Responsive job scheduling maturity level. FIG. 6 illustrates the transition from an Efficient maturity level to a Responsive maturity level in terms of: a standard set 601 of people, processes, and technology typical of an organization operating at an efficient job scheduling maturity level; a set 603 of exemplary processes (including primary maturation processes), software, services, and/or products that are used to shift the organization to the efficient job scheduling maturity level; and a standard set 605 of people, processes, and technology necessary for an organization to operate at an active job scheduling maturity level. As would be appreciated by one having ordinary skill in the art, FIG. 6 is exemplary only; other job scheduling maturity levels having other characteristics may exist. Additionally, while one or more of the products, software, services, or other items in set 603 and elsewhere herein may refer to products or services available from Computer Associates, Inc., one of ordinary skill in the art would recognize that similar products or services available from other sources may be used in their place. In one embodiment, the one or more secondary maturation operations may generally provide business continuity that maps back to one or more service level agreements the organization has with one or more customers.

The service level management aspect of job scheduling at a Responsive maturity level may include a central job scheduling service that is registered in a service catalogue (the service catalogue may include a guide to all services available providing written statements of service capabilities and options), service level agreements (SLAs) that are defined with customers of the central job scheduling service (those who utilize the service, can be internal or external customers), and operation level agreements (OLAs) that are defined with supporters of the central job scheduling service. Furthermore, the service level management aspects of job scheduling at a Responsive maturity level may include certain goals such as, for example, ensuring that there is a clear agreement of what is expected from job scheduling services at all levels of the organization, guiding improvement of job scheduling services by reporting on metrics that define the quality of the service, or other goals.

This and/or other information may be utilized to devise and implement the one or more secondary maturation operations that will cause at least the service level management aspects of the organization to shift to a Responsive maturity level. In one embodiment, the secondary maturation operations relating to the service level management aspects of the organization may include defining the customers of the job scheduling service; defining quality metrics covering availability and performance of functions including: uptime, capacity, and specific functionality of the service; specifying appropriate service levels based on the metrics with customers; specifying appropriate operation levels with organizations that support the job scheduling services; defining service level and operation agreements; creating processes that allow users to subscribe to the central job scheduling service that include signing predefined service level agreements and requesting new service level agreements; and creating a process for cyclical review of service metrics towards the goal of delivering a better service and meeting service level agreements, or other operations.

Figure 7:
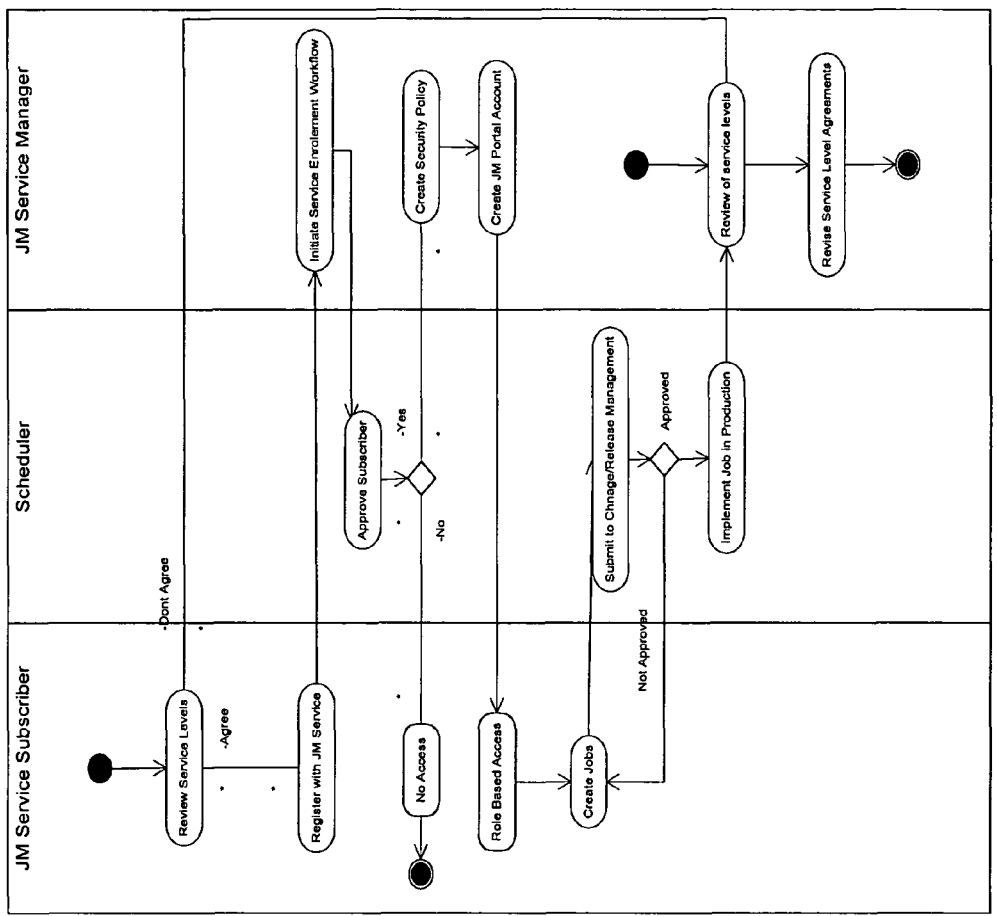
FIG. 7 illustrates a process blueprint according to an embodiment of the invention.

FIG. 7 illustrates an example of a process blueprint 700 for service level management at a Responsive maturity level. With reference to process blueprint 700, job scheduling subscribers/customers review the terms of a relevant service level agreement. After agreeing to the terms of the service level agreement, service subscribers may access the job scheduling service through a service catalogue. If the subscriber is approved, the job scheduling service provisions user access to the subscriber. If the subscriber is not approved, the subscriber is denied access. If potential subscribers do not agree with the service level agreement or are not approved, the service level agreement may be further reviewed for business relevance. The task of reviewing service levels may involve monitoring service level metrics against acceptable values. An example of a service level metric may include, may include job throughput (e.g., how many jobs can we run in a day?), acceptable lag time between commencement of a job as compared to its scheduled start time, the amount of acceptable job failures as a percentage of the total number of jobs, the time to resolution of job failures, or other metrics.

The financial management aspect of job scheduling at a Responsive maturity level may be such that the cost of job scheduling services includes people (e.g., the cost of salaries, benefits etc.), process (e.g., the cost of implementing processes, such as training, user guides, etc.), maintenance (e.g., the cost of maintaining the processes and systems), and technology (e.g., the cost of new technology), and data collection and analysis that exists to feed capacity management and service level management processes. Furthermore, the financial management aspects of job scheduling at a Responsive maturity level may include certain goals such as, for example, accounting for the cost of delivering job scheduling services, providing cost data to capacity management, reconciling costs with the service level management processes, or other goals.

Figure 8:
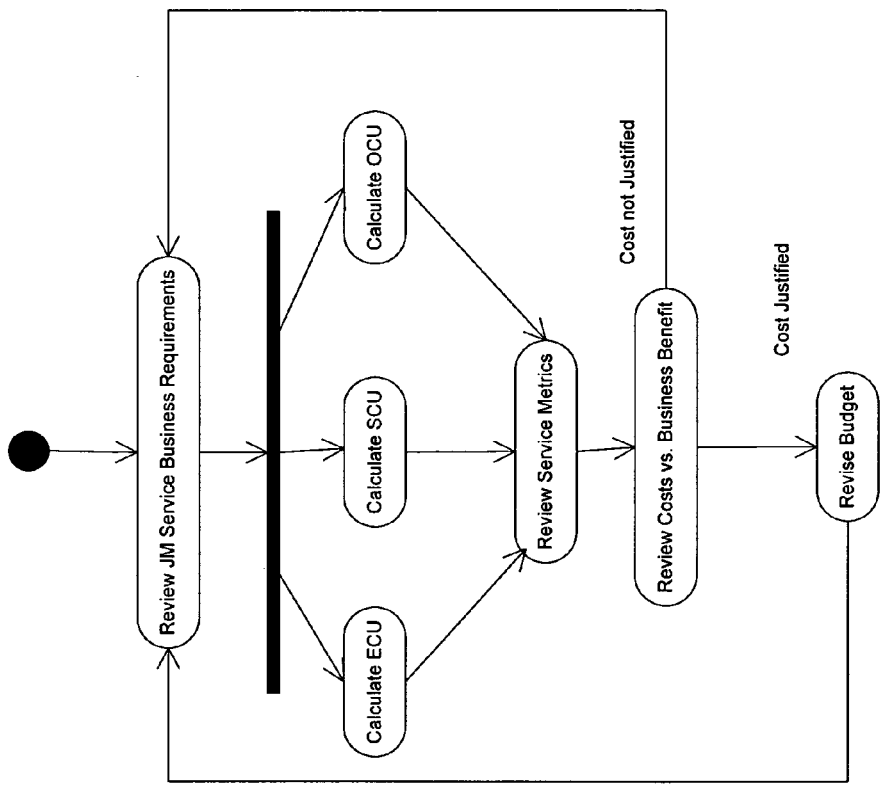
FIG. 8 illustrates a process blueprint according to an embodiment of the invention.

This and/or other information may be utilized to devise and implement the one or more secondary maturation operations that will cause at least the financial management aspects of the organization to shift to a Responsive maturity level. In one embodiment, the secondary maturation operations relating to the financial management aspects of the organization may include tracking the cost of the physical space the central job scheduling service requires (e.g., housing, office space, datacenter racks, etc.) in terms of accommodation cost units (ACUs); tracking the costs of the internal facilities, security, monitoring charges between departments of the organization in terms of transfer cost units (TCUs); overall cost accounting; implementing a reporting and review process associated with the cost of the job scheduling service (using products such as, for example, Unicenter™ Service Delivery or Unicenter™ Service Level Management, both of which are available from Computer Associates, Inc., or other products); or other operations. FIG. 8 illustrates an example of a process blueprint 800 for financial management at a Responsive maturity level.

The capacity management aspect of job scheduling at a Responsive maturity level may include knowledge of the high water mark (the highest level of job processing throughput achieved by the scheduling service) of the organization's systems, an understanding of system utilization vs. the high water mark, and dynamic placement of work based on utilization. Furthermore, the capacity management aspects of job scheduling at a Responsive maturity level may include certain goals such as, for example, knowledge of the capacity of the job scheduling process, understanding growth trends and future requirements, providing service level management with realistic throughput metrics, or other goals.

This and/or other information may be utilized to devise and implement the one or more secondary maturation operations that will cause at least the capacity management aspects of the organization to shift to a Responsive maturity level. In one embodiment, the secondary maturation operations relating to the capacity management aspects of the organization may include: implementing a process for gauging the high water mark for job processing and event throughput of the central job scheduling system, implementing technology for monitoring the throughput (using, for example, Unicenter™ NSM DB programmable watcher, available from Computer Associates, Inc.), implementing technology for trend analysis of throughput (using, such as, for example, Unicenter™ PMO, available from Computer Associates, Inc.), implementing load balancing technology to place work on the system with the best available resources, or other operations.

Figure 9:
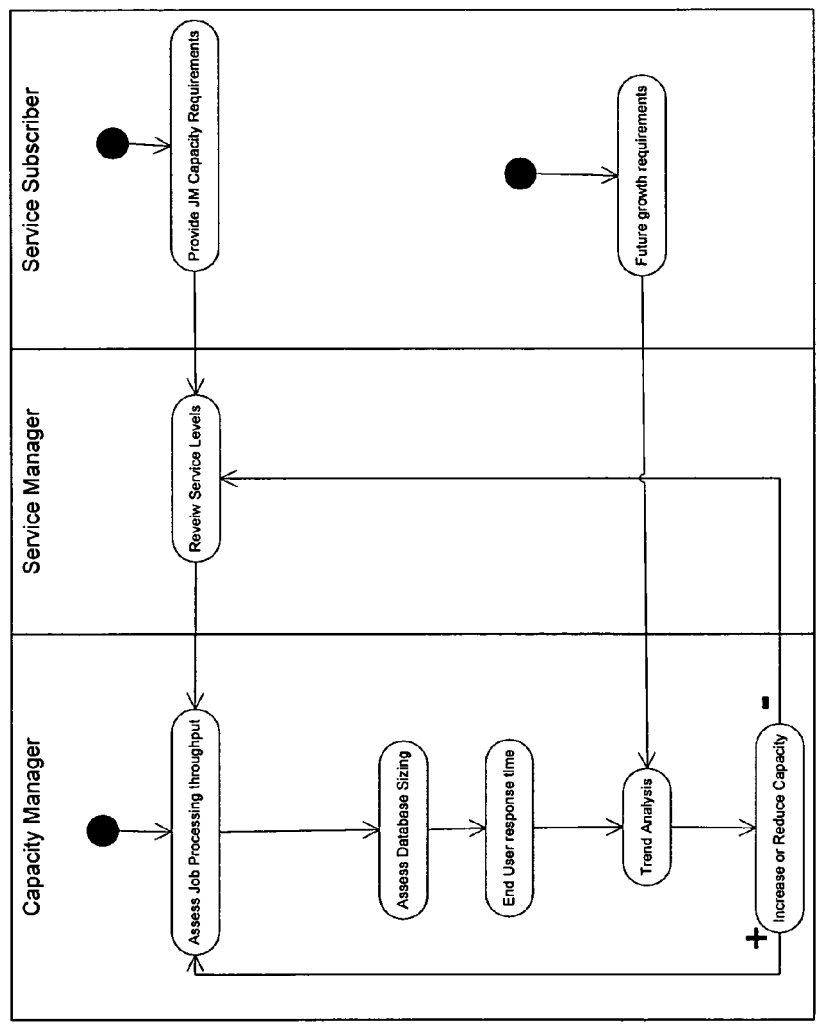
FIG. 9 illustrates a process blueprint according to an embodiment of the invention.

FIG. 9 illustrates an example of a process blueprint 900 for capacity management at a Responsive maturity level. Referring to FIG. 9, service subscribers may provide job scheduling capacity requirements while reviewing service level agreements. Capacity managers may use metrics provided by the job scheduling service to assess job processing through-put. Database sizing methods for job management data may be critical to the throughput of the job scheduling service. Trend analysis may include a compilation of data based on historical gathering of real data and future growth requirements provided by the job scheduling service subscriber. Capacity may be increased or reduced based on the future requirements.

The service level management aspect of job scheduling at a Responsive maturity level may include hot standby scheduling and automation infrastructure and database transaction level replication across wide area networks. Furthermore, the business continuity aspects of job scheduling at a Responsive maturity level may include certain goals such as, for example, maintaining ongoing risk assessment processes, ensuring that critical business processes can continue in the event of a disaster, providing service level management with business continuity expectations, or other goals.

This and/or other information may be utilized to devise and implement the one or more secondary maturation operations that will cause at least the business continuity aspects of the organization to shift to a Responsive maturity level. In one embodiment, the secondary maturation operations relating to the business continuity aspects of the organization may include implementing risk assessment processes, determining disaster scenarios, implementing a service replication process following best practices for the job scheduling engine, creating test failover procedures and gauging the business recovery time, documenting any knowledge service limitations for a recovery site, implementing a process to update realistic service level management estimates for recovery after a disaster, or other operations.

Figure 10:
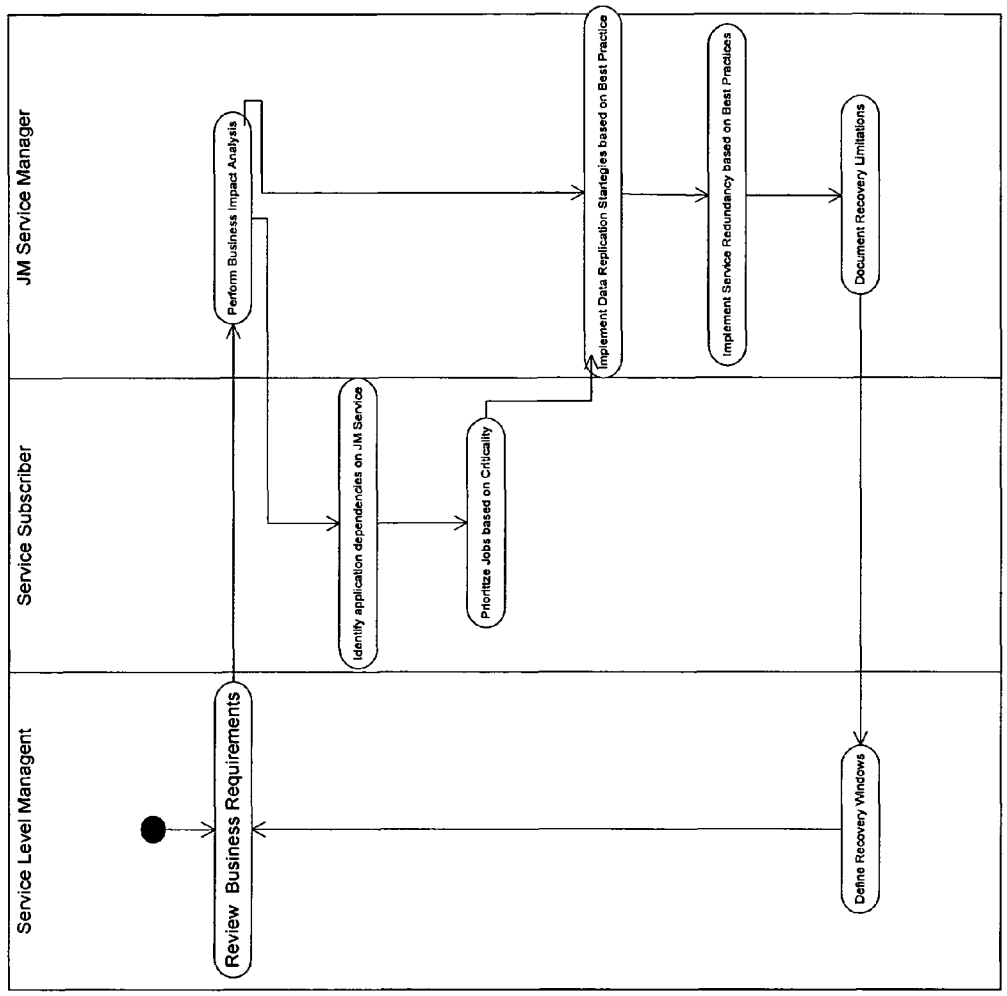
FIG. 10 illustrates a process blueprint according to an embodiment of the invention.

FIG. 10 illustrates an example of a process blueprint 1000 for business continuity at a Responsive maturity level. Referring to FIG. 10, business continuity processes may be initiated by service level management processes. A service manager may analyze business impact of the central job scheduling service and may implement best practices for data replication. The service manager may also implement service redundancy based on best practices. The document recovery limitations may be documented and recovery windows may be defined to service level management to be included in service level agreements.

The availability management aspect of job scheduling at a Responsive maturity level may include security that provides risk isolation, wherein users cannot impact each other's production, a job scheduling service that is potentially available to every user in the organization via a web interface, automated failover for job management and automation service failover for database high availability, and a job scheduling service redundant database. Furthermore, the availability management aspects of job scheduling at a Responsive maturity level may include certain goals such as, for example, ensuring the availability of the service meets service levels, ensuring that the service provided meets security compliance guidelines, reviewing functionality, making sure the service meets business requirements, ensuring the functionality is available to most users, or other goals.

This and/or other information may be utilized to devise and implement the one or more secondary maturation operations that will cause at least the availability management aspects of the organization to shift to a Responsive maturity level. In one embodiment, the secondary maturation operations relating to the availability management aspects of the organization may include implementing technology for monitoring the systems that support the job scheduling service (for example, Unicenter™ Network and Systems Manager, available from Computer Associates, Inc., or other systems), implementing high availability technology according to job management best practices (for example AutoSys™ High Availability option, available from Computer Associates, Inc., or other products), implementing rule-based security with best practice solution (for example, eTrust™, available from Computer Associates, Inc., or other products) to allow granular access to job scheduling services (wherein the controls may be compliant with Sarbanes-Oxley or other relevant regulations), implementing thin client, personalized access via a web portal, implementing object accessibility reporting in compliance with Sarbanes-Oxley, or other operations.

Figure 11:
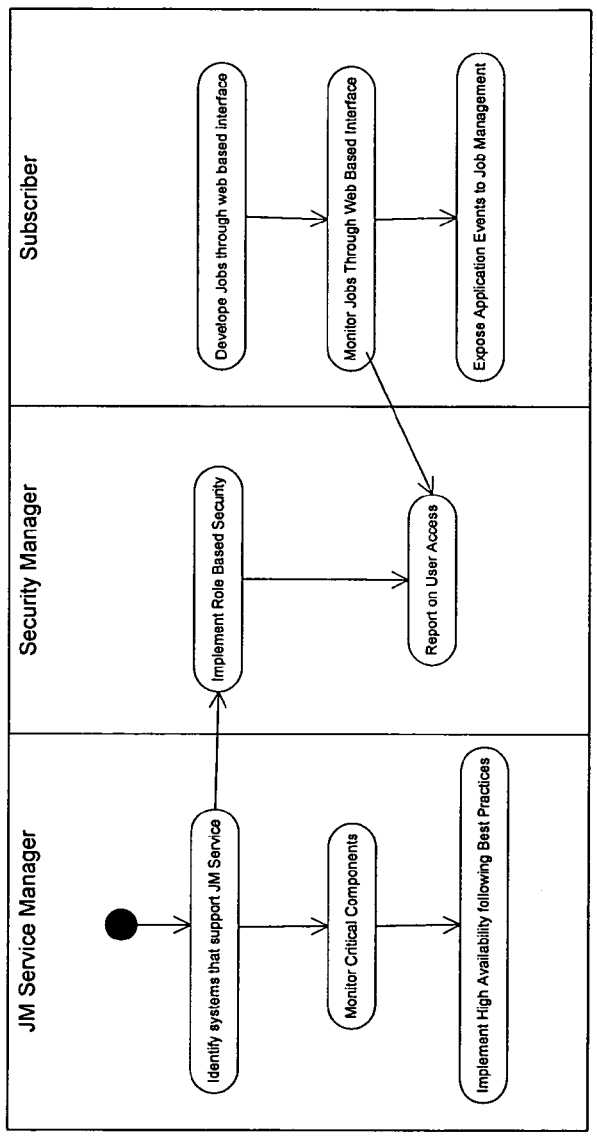
FIG. 11 illustrates a process blueprint according to an embodiment of the invention.

FIG. 11 illustrates an example of a process blueprint 1100 for availability management at a Responsive maturity level. Referring to FIG. 11, the job scheduling service manager may initiate the process of availability management by identifying the underlying systems that support the job scheduling service (including hardware, software, network resources, or other systems). The security manager may implement role-based security and may monitor and report on subscriber access. The job scheduling service manager may ensure that critical components of the job scheduling system are monitored by information technology operations management. High availability may be implemented according to best practices. Finally, subscribers, specifically application developers, may improve availability by exposing application events to the job scheduling system via event management.

The incident management aspect of job scheduling at a Responsive maturity level may include exception based monitoring, wherein failures automatically open incident tickets, wherein known recovery actions are documented and implemented, and automated policy driven corrections are implemented. Furthermore, the incident management aspects of job scheduling at a Responsive maturity level may include certain goals such as, for example, providing a mechanism to resolve incidents affecting job scheduling services, providing a mechanism to determine the root causes of incidents (to prevent reoccurrence), feeding incidents to an enterprise problem management system, or other goals.

This and/or other information may be utilized to devise and implement the one or more secondary maturation operations that will cause at least the incident management aspects of the organization to shift to a Responsive maturity level. In one embodiment, the secondary maturation operations relating to the incident management aspects of the organization may include implementing an event management system (for example a network and systems manager) that is integrated with job scheduling systems, implementing role-based operator consoles to monitor job scheduling status, implementing event notification policies to notify operators and open trouble tickets when trouble occurs, implementing event policies and recovery jobs to automatically correct trouble, implementing portal technology to ensure recovery procedures are available electronically to all operators, or other operations.

Figure 12:
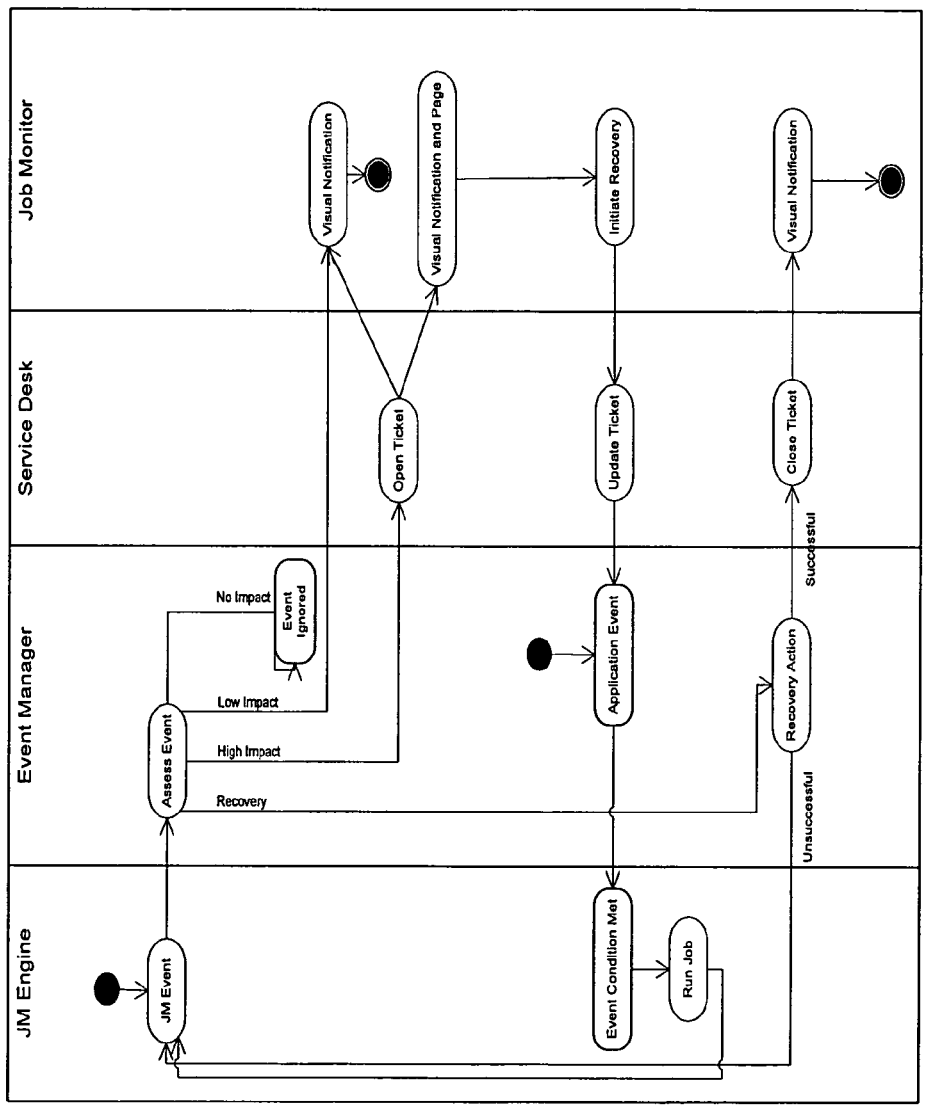
FIG. 12 illustrates a process blueprint according to an embodiment of the invention.

FIG. 12 illustrates an example of a process blueprint 1200 for incident management at a Responsive maturity level. Referring to FIG. 12, job scheduling events (incidents) may be forwarded from a job management service to the an event manager where the severity of the event is evaluated. Low impact events result in visual notification and high impact events result in the opening of a trouble ticket in a health desk system. If a job fails, it may initiate a recovery by sending a recovery event and running a recovery job. After the recovery event is evaluated, the recovery action is performed. If successful, any corresponding trouble ticket should be closed.

The change and configuration management aspect of job scheduling at a Responsive maturity level may be such that job scheduling configuration item information is gathered and available in a repository (although, not necessarily a CMDB). Furthermore, the change and configuration management aspects of job scheduling at a Responsive maturity level may include certain goals such as, for example, accounting for all assets that make up the job scheduling services, providing accurate information on job scheduling configurations, maintaining a process for controlling job definitions and event policy to minimize disruptions, or other goals.

This and/or other information may be utilized to devise and implement the one or more secondary maturation operations that will cause at least the change and configuration management aspects of the organization to shift to a Responsive maturity level. In one embodiment, the secondary maturation operations relating to the change and configuration management aspects of the organization may include implementing technology to account for assets that support job scheduling services (such as, for example, Unicenter™ Automation Manager, available from Computer Associates), implementing change control processes for job definitions and event policy based on the change control information technology information flow, implementing change control processes for configuration settings on systems that provide job scheduling services (based on the change control information technology information flow), or other operations.

The personnel management aspect of job scheduling at a Responsive maturity level may include personnel who understand their role and understand how to use job scheduling tools effectively, but the skill set for roles may not be strictly required and interaction with other processes may not be well defined. Furthermore, the personnel management aspects of job scheduling at a Responsive maturity level may include certain goals such as, for example, managing the roles of people involved in delivering and maintaining the job scheduling services, maintaining required skill-sets and reconciling deficiencies with training, or other goals.

This and/or other information may be utilized to devise and implement the one or more secondary maturation operations that will cause at least the personnel management aspects of the organization to shift to a Responsive maturity level. In one embodiment, the secondary maturation operations relating to the personnel management aspects of the organization may include defining roles to support all processes, determining the "people requirement" for all roles, providing gap analysis on skills (the gap between the skills you have and the skills you need), or other operations.

The business integration aspect of job scheduling at a Responsive maturity level may be such that jobs are based on system and application events. Furthermore, the business integration aspects of job scheduling at a Responsive maturity level may include certain goals such as, for example, ensuring applications are efficiently exploiting the central job scheduling service, ensuring that the central job scheduling service is aware of events taking place in applications across the organization, or other goals.

This and/or other information may be utilized to devise and implement the one or more secondary maturation operations that will cause at least the business integration aspects of the organization to shift to a Responsive maturity level. In one embodiment, the secondary maturation operations relating to the business integration aspects of the organization may include analyzing dependency requirements of systems and services, implementing event management to capture events from all relevant systems, training developers and administrators on bi-directional relationships between events and jobs, or other operations.

Figure 13:
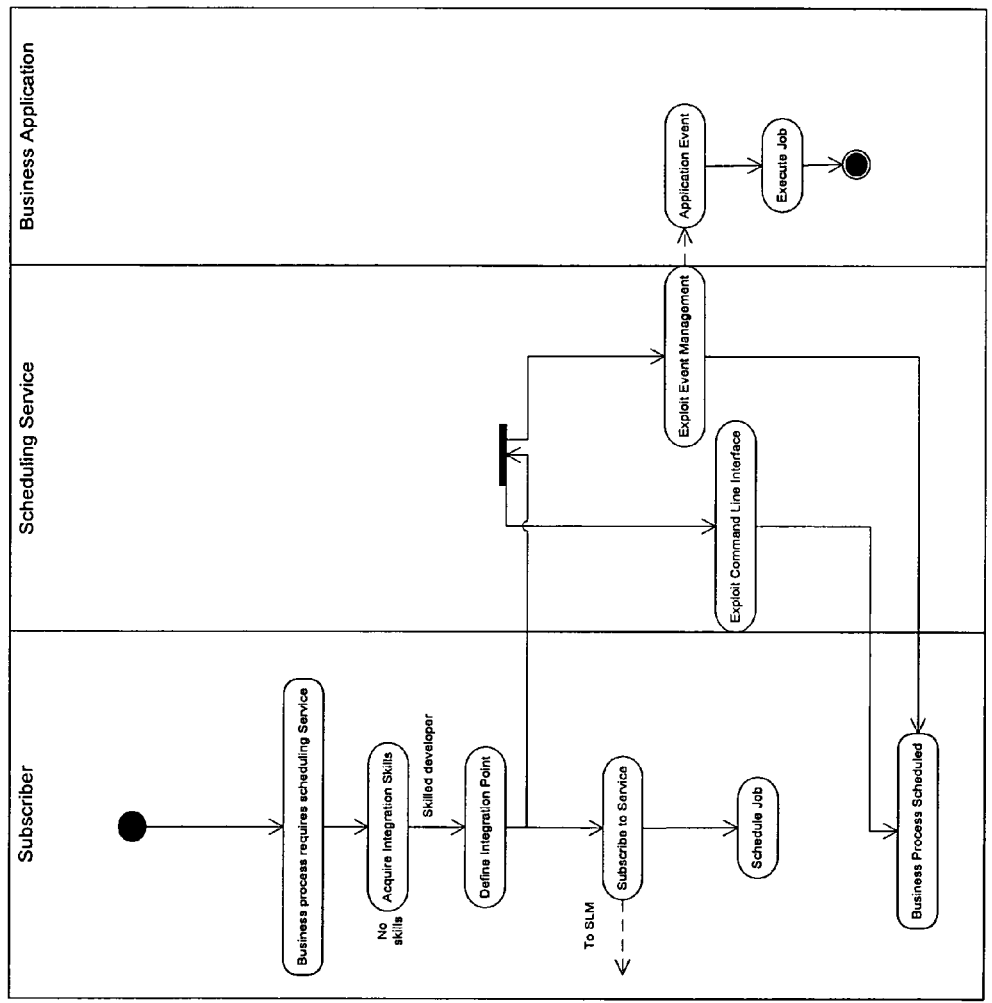
FIG. 13 illustrates a process blueprint according to an embodiment of the invention.

FIG. 13 illustrates an example of a process blueprint 1300 for business integration at a Responsive maturity level. Referring to. FIG. 13, business requirements may initiate business integration processes. Application developers may acquire business integration skills with software development kit (SDK) training. Application developers may code their application to send events to an event manager (e.g., a software component that can consolidate events from many different sources and automate responses to those events) using event management or a command line interface. Developers are then able to create job dependencies on application events.

FIG. 2B illustrates a process blueprint 200b, which is an example of a process blueprint for centralized job scheduling at a Responsive maturity level. Those of skill in the art will recognize that FIG. 2B includes some or all of the process blueprints illustrated in FIGS. 7 through 13. In FIGS. 2B, 7-16, and other figures herein, the term "JM" may refer to "job management," which may be equivalent to the term "job scheduling," as used herein.

Referring back to FIG. 3, in an operation 311, the organization's shift to the Responsive maturity level may be monitored and/or verified. This verification may include monitoring the job scheduling performance across one or more of the organizational aspects, measurement of predefined critical success factors, and/or other methods.

Figure 14:
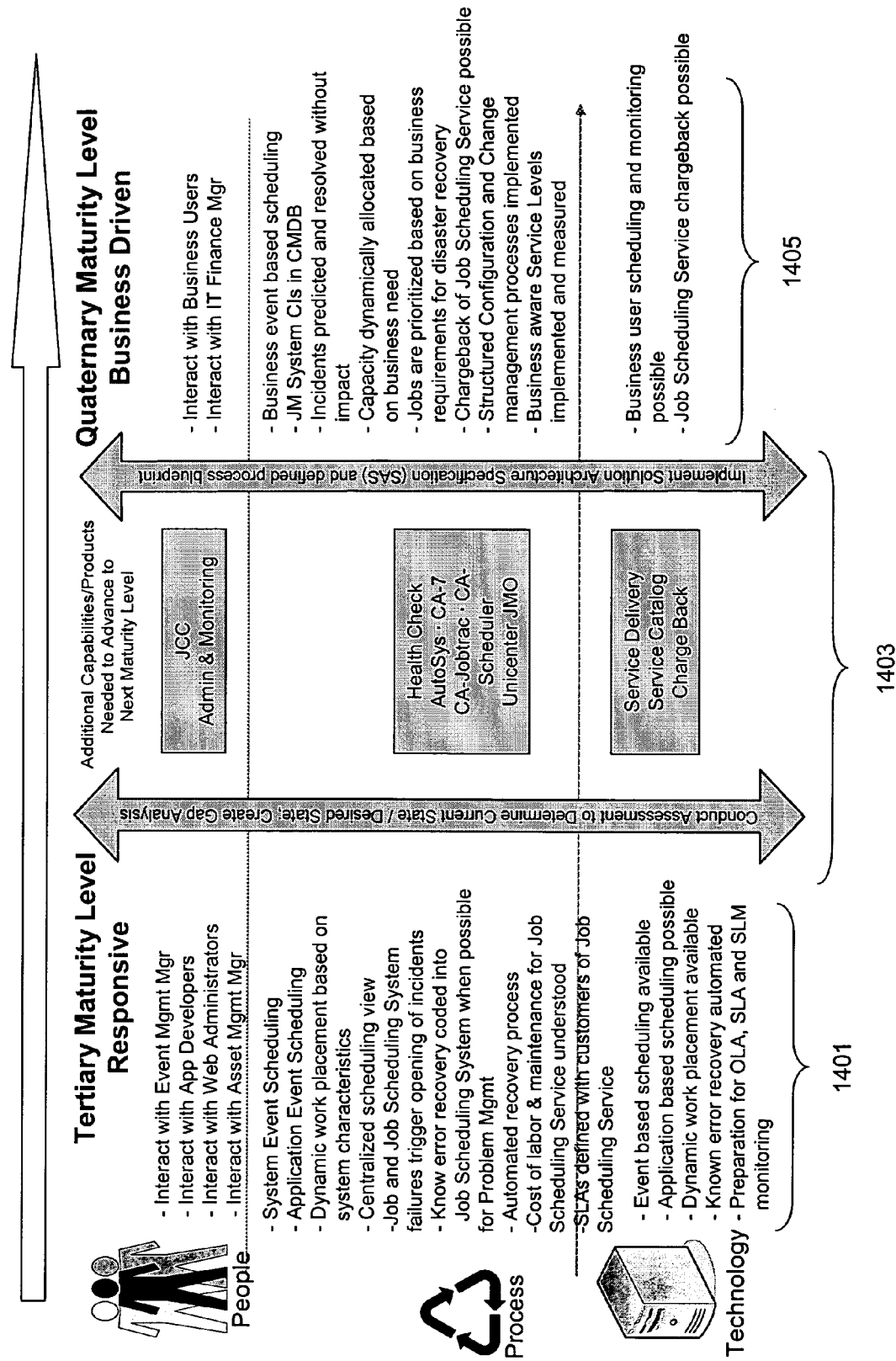
FIG. 14 illustrates a process for improving the job scheduling maturity level according to an embodiment of the invention.

In an operation 313, one or more tertiary maturation operations may be devised and performed across one or more of the organizational aspects to shift the organization from the Responsive job scheduling maturity level to a Business-Driven job scheduling maturity level. FIG. 14 illustrates the transition from a Responsive maturity level to a Business-Driven maturity level in terms of: a standard set 1401 of people, processes, and technology typical of an organization operating at a responsive job scheduling maturity level; a set 1403 of exemplary processes (including tertiary maturation processes), software, services, and/or products that are used to shift the organization to the business-driven job scheduling maturity level; and a standard set 1405 of people, processes, and technology typical of an organization operating at a business-driven job scheduling maturity level. As would be appreciated by one having ordinary skill in the art, FIG. 14 is exemplary only; other job scheduling maturity levels having other characteristics may exist. Additionally, while one or more of the products, services, or other items in set 1403 or elsewhere herein may refer to products or services available from Computer Associates, Inc., one of ordinary skill in the art would recognize that similar products or services available from other sources may be used in their place. In one embodiment, the one or more tertiary maturation operations may focus the job scheduling structure of the organization on business objectives rather than information technology objectives.

The service level management aspect of job scheduling at a Business-Driven maturity level may include the central scheduling service improving profitability by providing a service that directly and/or indirectly relates to product quality while lowering the cost of operations. Furthermore, the service level management aspects of job scheduling at a Business-Driven maturity level may include certain goals such as, for example, ensuring that service level agreements and operating level agreements are tied to business objectives, providing business aware service levels, or other goals.

This and/or other information may be utilized to devise and implement the one or more tertiary maturation operations that will cause at least the service level management aspects of the organization to shift to a Business-Driven maturity level. In one embodiment, the tertiary maturation operations relating to the service level management aspects of the organization may include implementing service level agreement monitoring to proactively alert when the organization is trending towards failure, upgrading the process for cyclical review of service metrics with the goal of delivering business-driven service level agreements, or other operations.

The financial management aspect of job scheduling at a Business-Driven maturity level may include the cost of service that increases in line with business productivity, the cost of service that includes people, process and technology maintenance as well as facilities and storage utilization, wherein a chargeback system is also in place. Furthermore, the financial management aspects of job scheduling at a Business-Driven maturity level may include certain goals such as, for example, providing a complete cost of the job scheduling service, reconciling costs with the service level management processes to improve the bottom line (profitability), or other goals.

This and/or other information may be utilized to devise and implement the one or more tertiary maturation operations that will cause at least the financial management aspects of the organization to shift to a Business-Driven maturity level. In one embodiment, the tertiary maturation operations relating to the financial management aspects of the organization may include reconciling costs against business demand to justify the central job scheduling service, adding the transfer cost units (TCUs) to the total cost assessment of the central scheduling service, implementing a chargeback system that is tied to service utilization (this may, for example, shift the costs to business units so decisions regarding service levels are closer to the business), or other operations.

The capacity management aspect of job scheduling at a Business-Driven maturity level may include a system wherein capacity is dynamically allocated based on business requirements and priorities. Furthermore, the capacity management aspects of job scheduling at a Business-Driven maturity level may include certain goals such as, for example, including business priorities as part of workflow job definitions, allocating resources based on business priorities, or other goals.

This and/or other information may be utilized to devise and implement the one or more tertiary maturation operations that will cause at least the capacity management aspects of the organization to shift to a Business-Driven maturity level. In one embodiment, the tertiary maturation operations relating to the capacity management aspects of the organization may include: modifying the capacity management processes to include a designation for business priority, implementing technology to ensure work prioritization that is in sync with business requirements, or other operations.

The business continuity management aspect of job scheduling at a Business-Driven maturity level may include jobs that are notated with business impact detail and that can be easily prioritized in the event of a disaster and job data that is in sync with application data to ensure that lag time does not create inconsistent data. Furthermore, the business continuity management aspects of job scheduling at a Business-Driven maturity level may include certain goals such as, for example, ensuring risk assessment processes that categorize the business impact of application downtime, ensuring that application data is in synch with job scheduling data at a disaster recovery site, or other goals.

This and/or other information may be utilized to devise and implement the one or more tertiary maturation operations that will cause at least the business continuity management aspects of the organization to shift to a Business-Driven maturity level. In one embodiment, the tertiary maturation operations relating to the business continuity management aspects of the organization may include: adding business impact job definitions to ensure that disaster recovery is prioritized, implementing data replication technology that can checkpoint with application data, or other operations.

The availability management aspect of job scheduling at a Business-Driven maturity level may include making the job scheduling service available to all applications in the organization without additional integration work and business users who can schedule jobs without knowledge of the scheduling engine. Furthermore, the availability management aspects of job scheduling at a Business-Driven maturity level may include certain goals such as, for example, ensuring that service level agreements for job scheduling services are tied to business objectives, ensuring that job scheduling services meet security compliance guidelines, reviewing functionality to make sure functionality meets business requirements, ensuring the functionality is available to all users as required by the organization's business structure, or other goals.

This and/or other information may be utilized to devise and implement the one or more tertiary maturation operations that will cause at least the availability management aspects of the organization to shift to a Business-Driven maturity level. In one embodiment, the tertiary maturation operations relating to the availability management aspects of the organization may include: implementing web services technology for accessing the central job scheduling service or other operations.

The incident management aspect of job scheduling at a business-Driven maturity level may include incidents are predicted and resolved without impact. Furthermore, the availability management aspects of job scheduling at a Business-Driven maturity level may include certain goals (which may be similar to the incident management goals at the responsive maturity level) such as, for example, providing a mechanism to resolve incidents affecting job scheduling services, providing a mechanism to determine the root causes of incidents to prevent reoccurrence, feeding incidents to an enterprise problem management system, or other goals. These goals may be the same at the Business-Driven maturity level as they were at the responsive maturity level. However, at the Business-Driven maturity level, the incidents themselves should become predictable.

This and/or other information may be utilized to devise and implement the one or more tertiary maturation operations that will cause at least the incident management aspects of the organization to shift to a Business-Driven maturity level. In one embodiment, the tertiary maturation operations relating to the incident management aspects of the organization may include implementing predictive analysis technology for critical path monitoring, implementing advanced event correlation technology, or other operations.

The change and configuration management aspect of job scheduling at a Business-Driven maturity level may include implementing a change management database, configuration items for scheduling engine components, and configuration items for batch job elements (programs, scripts [shell scripts on unix], PROCs or JCLs [mainframe scripts], etc.). Furthermore, the change and configuration management aspects of job scheduling at a Business-Driven maturity level may include certain goals such as, for example, accounting for all assets that make up the job scheduling services, providing accurate information on job scheduling configurations, maintaining a process for controlling job definitions and event policy to minimize disruptions, or other goals.

This and/or other information may be utilized to devise and implement the one or more tertiary maturation operations that will cause at least the change and configuration management aspects of the organization to shift to a Business-Driven maturity level. In one embodiment, the tertiary maturation operations relating to the change or configuration management aspects of the organization may include: implementing job management assets in a change management database (CMDB), implementing change control processes for job definitions and event policy in the decision support library (DSL—where source code should be stored), or other operations.

The personnel management aspect of job scheduling at a Business-Driven maturity level may include job scheduling personnel who thoroughly understand how to support other processes, role definitions that includes skill-sets, defining processes between roles, users' graphical user interfaces are customized by role, and monitoring by exception (a display of jobs sorted by one or more characteristics such as, for example, a display of only failed jobs). Furthermore, the personnel management aspects of job scheduling at a Business-Driven maturity level may include certain goals (which may be the same or similar to the personnel management goals at a responsive maturity level) such as, for example, managing the roles of personnel involved in delivering and maintaining the job scheduling services, maintaining required skill-sets and reconciling deficiencies with training.

This and/or other information may be utilized to devise and implement the one or more tertiary maturation operations that will cause at least the personnel management aspects of the organization to shift to a Business-Driven maturity level. In one embodiment, the tertiary maturation operations relating to the personnel management aspects of the organization may include detailing skills for each role and training required to support those skills, defining roles to support all processes, determining personnel requirements for all roles, or other operations.

The business integration aspect of job scheduling at a Business-Driven maturity level may include jobs that are based on system application and business events. Furthermore, the business integration aspects of job scheduling at a Business-Driven maturity level may include certain goals (which may be the same or similar to the business integration goals at a responsive maturity level) such as, for example, ensuring that applications are efficiently exploiting job scheduling services, ensuring that job scheduling services are aware of events taking place in applications.

This and/or other information may be utilized to devise and implement the one or more tertiary maturation operations that will cause at least the business integration management aspects of the organization to shift to a Business-Driven maturity level. In one embodiment, the tertiary maturation operations relating to the business integration management aspects of the organization may include: analyzing dependency requirements of systems and services, implementing event management to capture business events from applications, training developers and administrators on bi-directional relationships between business events and jobs, or other operations.

Figure 15:
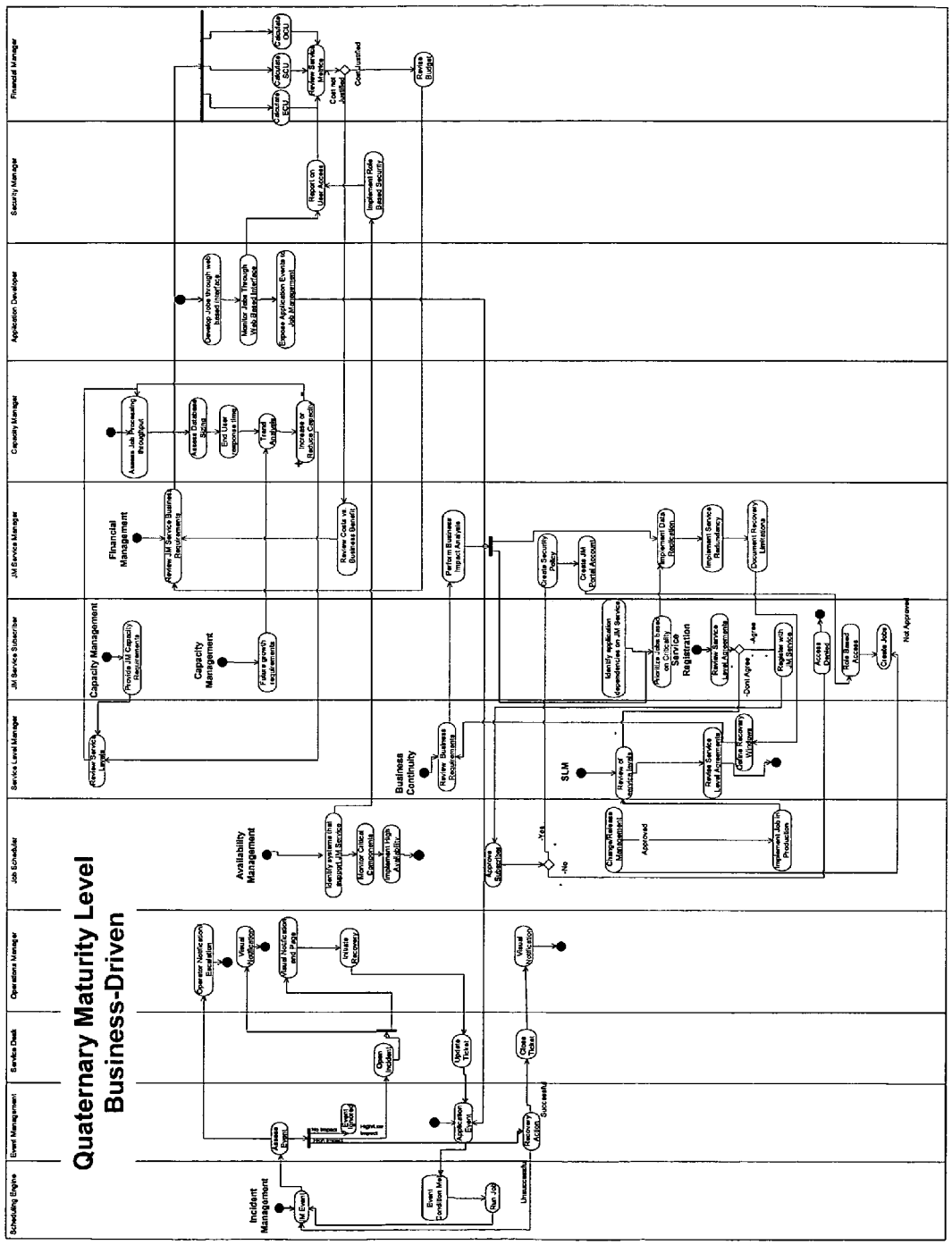
FIG. 15 illustrates a process blueprint according to an embodiment of the invention.

Returning back to FIG. 3, once the one or more tertiary maturation operations have been performed, the organizational shift may be verified and/or monitored in an operation 315. This monitoring/verification may include monitoring the job scheduling performance across one or more of the organizational aspects, measurement of predefined critical success factors, and/or other methods. Once the tertiary maturation operations have been performed, the organization's job scheduling systems may operate at a Business-Driven maturity level. FIG. 15 illustrates process blueprint 1500, which is an example of a process blueprint of an organization whose job scheduling services operate at a Business-Driven maturity level. Those of skill in the art will recognize that FIG. 15 may be comprised of individual process blueprints, each relating to one of the individual organizational aspects discussed herein.

Figure 16:
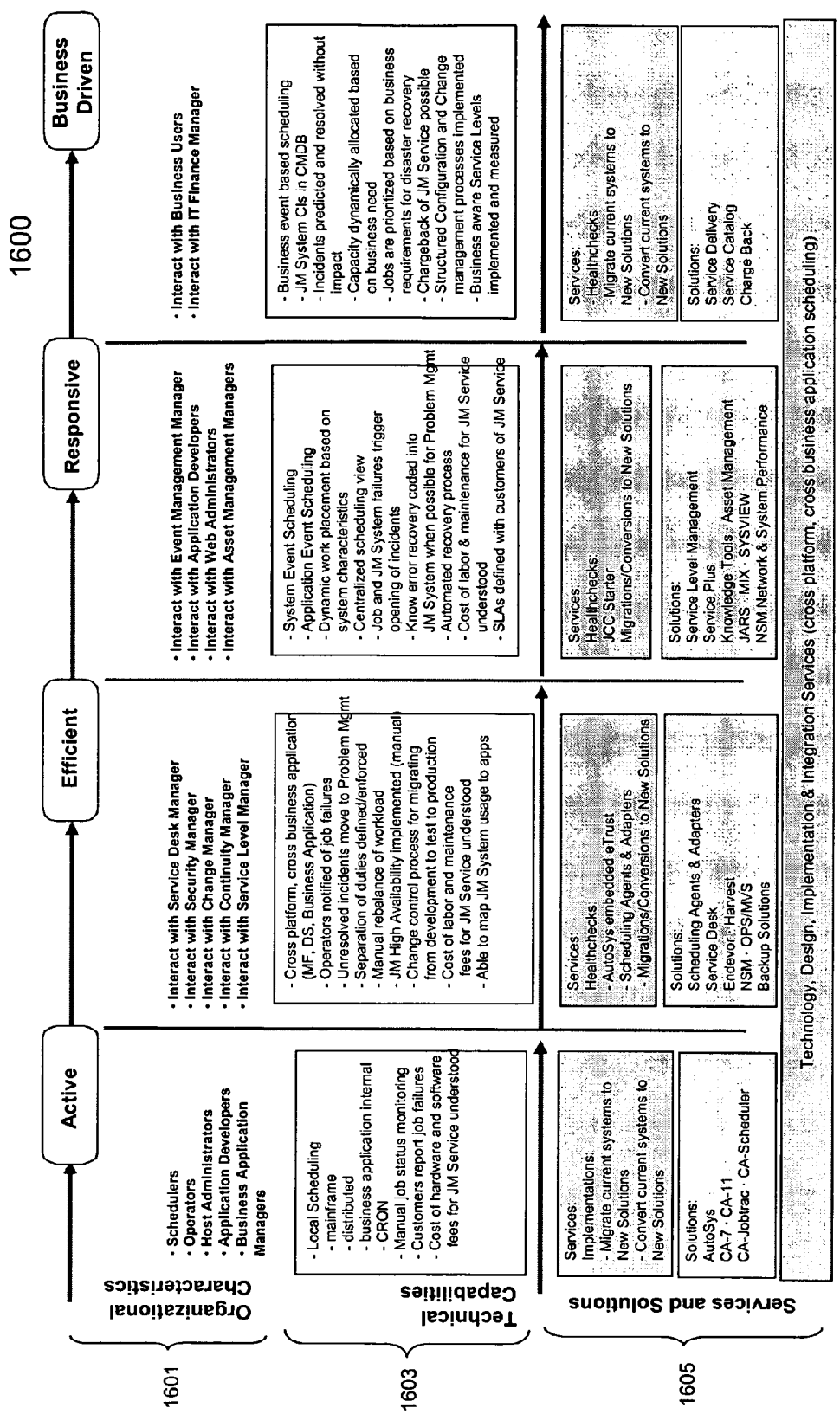
FIG. 16 illustrates a stepwise process for raising an organization's job scheduling processes from an Active to a Business-Driven maturity level.

FIG. 16 is a flow chart illustrating an overview of the process for improving the job scheduling maturity level of an organization from "Active" to "Business-Driven" in terms of exemplary organizational characteristics 1601, exemplary technical capabilities 1603, and exemplary services and solutions 1605. FIG. 16 provides additional detail to the improvement process described herein in FIG. 3.

Figure 17:
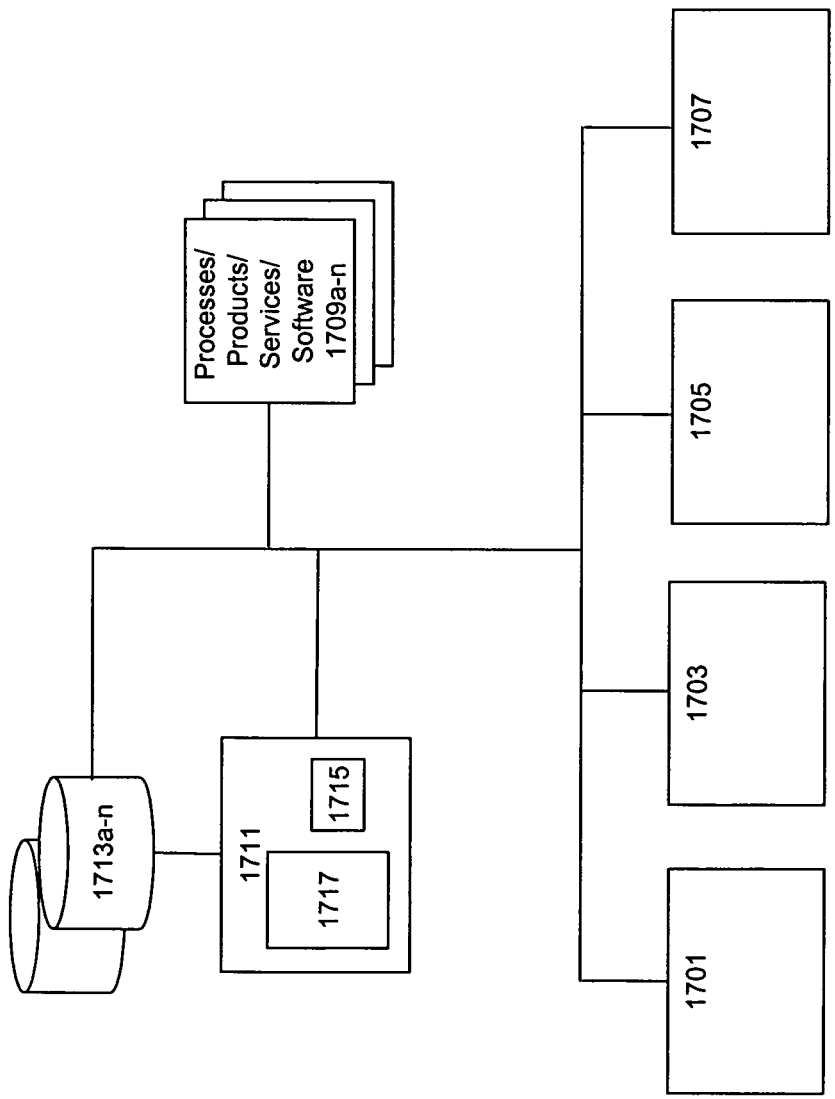
FIG. 17 illustrates a system for improving an organization's job scheduling maturity level according to an embodiment of the invention.

According to an embodiment of the invention illustrated in FIG. 17, the invention provides a system 1700 that enables performance of the processes, operations and/or features herein, including assessing the current job scheduling maturity level of an organization, devising strategies for improving the maturity level, and implementation of those strategies to improve the maturity level of the organization. System 1700 may include a information manager 1701, an assessment manager 1703, a planning manager 1705, an implementation manager 1707, and/or other elements.

In one embodiment, information manager 1701 may comprise one or more software modules, a person or group of people, a system or part thereof (including, but not limited to, a computer system), and/or other elements. Information manager 1701 may be adapted to receive and/or store information, including current job scheduling information, regarding one or more organizations or to perform other processes, operations or features described herein.

In one embodiment, an assessment manager 1703 may comprise one or more software modules, a person or group of people, a system or part thereof (including, but not limited to, a computer system), and/or other elements. Assessment manager 1703 may be adapted to utilize information or data, including an organization's current job scheduling information, to assess the current job scheduling maturity level of the organization, and/or to perform other operations, processes or features described herein. In some embodiments, assessment manager 1703 may enable the determination/defining of a plurality of job scheduling maturity levels. In some embodiments, assessment manager 1703 may arrange the maturity levels in a hierarchy. In some embodiments, assessment manager 1703 may construct blueprints, lists, charts or other representations or informational documents regarding one or more of the plurality of maturity levels.

In one embodiment, planning manager 1705 may include one or more software modules, a person or group of people, a system or part thereof (including, but not limited to, a computer system), and/or other elements. Planning manager 1705 may be adapted to devise one or more maturation operations that, when implemented, will shift an organization to a higher job scheduling maturity level and/or to perform other processes, operations, or features described herein. In one embodiment, planning manager 1705 may identify one or more products/processes/software/services 1709*a-n* for use in the one or more maturation operations.

In one embodiment, implementation manager 1707 may include one or more software modules, a person or group of people, a system or part thereof (including, but not limited to, a computer system), and/or other elements. Implementation manager 1707 may be adapted to perform the one or more maturation operations and/or to perform other processes, operations or features described herein. In some embodiments, implementation manager 1707 may utilize and/or implement one or more products/processes/software/services 1709*a-n* to shift an organization's job scheduling maturity level.

In some embodiments, one or more of the elements of system 1700 may include and/or utilize a computer system 1711, data storage devices 1713*a-n*, or other computer-implemented elements. In some embodiments, computer system 1711 may include a processor 1715 and a control application 1717. In some embodiments, control application 1717 may comprise a website or computer application and may include and or operate one or more software modules which cause processor 1715 to perform one or more processes, operations, or features described herein.

Those having skill in the art will appreciate that the invention described herein may work with various system configurations. Accordingly, more or less of the aforementioned system components may be used and/or combined in various embodiments. It should also be understood any software modules and/or software applications that may utilized to accomplish the functionalities described herein may be implemented in various combinations of hardware and/or firmware, in addition to, or instead of, software.

In one embodiment, the invention may include a computer readable medium containing instructions that, when executed by at least one processor, cause the at least one processor to enable and/or perform the features, functions, and or operations of the invention as described herein, including any or all of the operations of the processes described in specification or the figures, and/or other operations.

While the invention has been described with reference to certain illustrated embodiments, the words that have been used herein are words of description, rather than words of limitation. Changes may be made, within the purview of the associated claims, without departing from the scope and spirit of the invention in its aspects. Although the invention has been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the associated claims.

What is claimed is:

1. A method to improve scheduling of tasks in an organization, the method being executed by a processor that performs a plurality of operations, the plurality of operations comprising:

receiving, at an information manager provided by the processor, current job scheduling information from an organization related to an organizational aspect of the organization, the current job scheduling information describing linear computer processing of discrete data sets within the organization;

determining, at an assessment manager provided by the processor, a current maturity level for the organization from among a plurality of predefined job scheduling maturity levels using the current job scheduling information, wherein each of the plurality of predefined job scheduling maturity levels comprises a process definition that supports processing of discrete data sets within the organization;

determining, at the assessment manager, a target maturity level from among the plurality of predefined job scheduling maturity levels; and devising, at a planning manager provided by the processor, one or more maturation operations for the organizational aspect that, when performed, shift the organization from the current maturity level to the target maturity level, wherein the one or more maturation operations to shift the organization from the current maturity level to the target maturity level comprise implementing conversion of decentralized computer job scheduling within the organization into a central computer job scheduling service within the organization.

2. The method of claim 1, further comprising, performing, by an implementation manager provided by the processor, at least one of the one or more maturation operations to shift the organization from the current maturity level to the target maturity level.

3. The method of claim 1, further comprising verifying, by the processor, the shift from the current maturity level to the target maturity level.

4. The method of claim 1, wherein devising one or more maturation operations further comprises comparing the current job scheduling information to a predefined set of people, processes, and technology for the target maturity level.

5. The method of claim 1, wherein the organizational aspect of the organization comprises one or more selected from: service level management, financial management, capacity management, business continuity, availability management, incident management, configuration and change management, personnel management, or business integration.

6. The method of claim 1, wherein the one or more maturation operations implement a central computer job scheduling service within the organization such that jobs from decentralized computer job schedulers are migrated to the central computer job scheduling service.

7. The method of claim 1, wherein the one or more maturation operations provide business continuity that maps back to a service level agreement the organization has with a customer.

8. The method of claim 1, wherein the process definition of the current maturity level comprises scheduling jobs based on a system or application event, and wherein a process definition of the target maturity level comprises scheduling jobs at the central computer job scheduling service based on a business event.

9. A method to improve job scheduling in an organization, wherein job scheduling comprises linear computer processing of discrete data sets within the organization, the method being executed by a processor configured to perform a plurality of operations, the plurality of operations comprising:
   receiving, at an information manager provided by the processor, current job scheduling information from an organization related to an organizational aspect of the organization;
   devising, at a planning manager provided by the processor, one or more primary maturation operations for the organizational aspect that, when performed, shift the organization from a primary maturity level from a plurality of predefined job scheduling maturity levels to a secondary maturity level from the plurality of job scheduling maturity levels, wherein each of the plurality of job scheduling maturity levels comprises a process definition that supports job scheduling within the organization, and wherein the one or more primary maturation operations to shift the organization from the primary maturity level to the secondary maturity level comprise implementing conversion of decentralized computer job scheduling within the organization into a central computer job scheduling service;
   performing, by an implementation manager provided by the processor, at least one of the one or more primary maturation operations to shift the organization from the primary maturity level to the secondary maturity level;
   devising, at the planning manager, one or more secondary maturation operations for the organizational aspect that, when performed, shift the organization from the secondary maturity level to a tertiary maturity level from the plurality of job scheduling maturity levels; and
   performing, by the implementation manager, at least one of the one or more secondary maturation operations to shift the organization from the secondary maturity level to the tertiary maturity level.

10. The method of claim 9, further comprising devising, at the planning manager, one or more tertiary maturation operations for the organizational aspect that, when performed, shift the organization from the tertiary maturity level to a quaternary maturity level from the plurality of predefined job scheduling maturity levels; and
   performing, by the implementation manager, at least one of the one or more tertiary maturation operations to shift the organization from the tertiary maturity level to the quaternary maturity level.

11. The method of claim 10, wherein the one or more tertiary maturation operations focus the job scheduling of the organization on a business objective rather than an information technology objective.

12. The method of claim 10, wherein the one or more tertiary maturation operations comprise implementing service level agreement monitoring to monitor a job scheduling service metric and alerting the organization when job scheduling is trending towards failure.

13. The method of claim 9, wherein the one or more primary maturation operations comprise:
   migrating jobs in decentralized schedulers to the central computer job scheduling service, and
   devising a metric that measures utilization of the central computer job scheduling service.

14. The method of claim 9, wherein the one or more secondary maturation operations comprise mapping the central computer job scheduling service to a service level agreement the organization has with a customer.

15. The method of claim 9, wherein the one or more secondary maturation operations comprise defining a quality metric covering availability and performance of a function of the central computer job scheduling service, the quality metric comprising one or more selected from: uptime, capacity, or specific functionality of the job scheduling service.

16. The method of claim 9, wherein the process definition of the primary maturity level comprises considering only costs of hardware and software as costs associated with job scheduling, and wherein the process definition of the secondary maturity level comprises considering costs of labor and maintenance as costs associated with job scheduling.

17. The method of claim 16, wherein the process definition of the secondary maturity level comprises mapping usage of job scheduling services to at least costs of labor and maintenance associated with job scheduling.

18. The method of claim 9, wherein the process definition of the secondary maturity level comprises utilization of virtual machine technology between job definitions and physical systems where jobs are processed.

19. The method of claim 9, wherein the process definition of the secondary maturity level comprises backing up job definitions on a predefined time interval.

20. The method of claim 9, wherein the process definition of the secondary maturity level comprises installing job scheduling agent on a platform requiring access to the central scheduling service.

21. The method of claim 9, wherein the process definition of the secondary maturity level comprises determining a root cause of an incident to prevent reoccurrence.

22. The method of claim 9, wherein a process definition of the tertiary maturity level comprises a service catalogue comprising at least a written catalogue of services provided by the centralized computer job scheduling service.

23. The method of claim 9, wherein the process definition of the secondary maturity level comprises defining roles of personnel involved in delivery and maintenance of a centralized job computer scheduling service.

24. The method of claim 23, wherein the defined personnel roles comprise one or more selected from:

an information technology operations manager, a development manager, an information technology manager system administrator, a job scheduling manager, or a scheduling service manager.

25. A system to improve the job scheduling of an organization, wherein job scheduling comprises linear computer processing of discrete data sets within the organization, the system comprising:

a processor configured to:

receive current job scheduling information from an organization related to an organizational aspect of the organization, determine a current maturity level for the organization from among a plurality of predefined job scheduling maturity levels using the current job scheduling information, wherein each of the plurality of job scheduling maturity levels comprises a process definition that supports linear computer processing of discrete data sets within the organization, determine a target maturity level from among the plurality of predefined job scheduling maturity levels, and devise one or more maturation operations for the organizational aspect that, when performed, shift the organization from the current maturity level to the target maturity level, wherein the one or more maturation operations to shift the organization from the current maturity level to the target maturity level comprise implementing conversion of decentralized computer job scheduling within the organization into a central computer job scheduling service within the organization.

\* \* \* \* \*